(12) United States Patent
Seo

(10) Patent No.: US 10,189,370 B2
(45) Date of Patent: Jan. 29, 2019

(54) ELECTRICAL SOURCE CONTROL APPARATUS FOR CONVERTER SWITCH TEMPERATURE CONTROL

(71) Applicant: TOYOTA JIDOSHA KABUSHIKI KAISHA, Toyota-shi, Aichi-ken (JP)

(72) Inventor: Yusuke Seo, Kasugai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 120 days.

(21) Appl. No.: 15/312,274

(22) PCT Filed: May 15, 2015

(86) PCT No.: PCT/JP2015/064666
§ 371 (c)(1),
(2) Date: Nov. 18, 2016

(87) PCT Pub. No.: WO2015/178468
PCT Pub. Date: Nov. 26, 2015

(65) Prior Publication Data
US 2017/0088004 A1    Mar. 30, 2017

(30) Foreign Application Priority Data

May 20, 2014 (JP) .................................. 2014-104537

(51) Int. Cl.
*B60L 11/18* (2006.01)
*B60L 3/00* (2006.01)
(Continued)

(52) U.S. Cl.
CPC .......... *B60L 11/1868* (2013.01); *B60L 3/003* (2013.01); *B60L 7/14* (2013.01); *B60L 11/005* (2013.01);
(Continued)

(58) Field of Classification Search
CPC ............ H02M 2001/327; H02M 3/02–3/1588
See application file for complete search history.

(56) References Cited

U.S. PATENT DOCUMENTS

| | | | | |
|---|---|---|---|---|
| 2010/0207598 A1* | 8/2010 | Hamatani | ............... | H02M 1/32 323/351 |
| 2012/0235488 A1* | 9/2012 | Hamanaka | ............... | H02M 1/32 307/64 |

(Continued)

FOREIGN PATENT DOCUMENTS

| DE | 102011076199 A1 | 11/2012 |
|---|---|---|
| DE | 102012205970 A1 | 1/2013 |

(Continued)

*Primary Examiner* — Rexford Barnie
*Assistant Examiner* — David Shiao
(74) *Attorney, Agent, or Firm* — Hunton Andrews Kurth LLP

(57) ABSTRACT

An electrical source control apparatus has a selecting device for selecting one switching element from at least two switching elements each of which constitutes predetermined arm element whose switching state should be changed to perform the electrical power conversion, when the electrical power converter performs the electrical power conversion with either one of the first and the second electricity storage apparatuses; and a controlling device for controlling the electrical power converter to change a switching state of the selected one switching element while keeping a switching state of another one switching element in an ON state, the selecting device newly selects the one switching element to reduce a difference between temperatures of the at least two switching elements each of which constitutes predetermined arm element.

9 Claims, 19 Drawing Sheets

(51) Int. Cl.
  *B60L 7/14*      (2006.01)
  *B60L 11/00*     (2006.01)
  *B60L 11/12*     (2006.01)
  *B60L 11/14*     (2006.01)
  *H02M 3/158*     (2006.01)
  *H02M 1/32*      (2007.01)

(52) U.S. Cl.
  CPC ............ *B60L 11/123* (2013.01); *B60L 11/14* (2013.01); *B60L 11/1803* (2013.01); *B60L 11/1812* (2013.01); *B60L 11/1855* (2013.01); *B60L 11/1859* (2013.01); *B60L 11/1861* (2013.01); *B60L 11/1864* (2013.01); *B60L 11/1881* (2013.01); *H02M 3/158* (2013.01); *B60L 2210/12* (2013.01); *B60L 2210/14* (2013.01); *B60L 2210/40* (2013.01); *B60L 2240/525* (2013.01); *B60L 2240/526* (2013.01); *B60L 2240/527* (2013.01); *B60L 2240/547* (2013.01); *B60L 2260/26* (2013.01); *H02M 2001/327* (2013.01); *Y02T 10/6217* (2013.01); *Y02T 10/7022* (2013.01); *Y02T 10/7061* (2013.01); *Y02T 10/7066* (2013.01); *Y02T 10/7072* (2013.01); *Y02T 10/7077* (2013.01); *Y02T 10/7225* (2013.01); *Y02T 10/7233* (2013.01); *Y02T 10/7241* (2013.01); *Y02T 90/127* (2013.01); *Y02T 90/14* (2013.01); *Y02T 90/34* (2013.01)

(56) References Cited

U.S. PATENT DOCUMENTS

| | | | |
|---|---|---|---|
| 2013/0002227 A1* | 1/2013 | Ikeda | H02M 7/5387 |
| | | | 323/311 |
| 2014/0145694 A1 | 5/2014 | Ishigaki et al. | |
| 2014/0265605 A1 | 9/2014 | Ishigaki et al. | |
| 2015/0028831 A1 | 1/2015 | Glinka | |
| 2015/0207400 A1* | 7/2015 | Shenoy | H02M 3/1584 |
| | | | 323/213 |

FOREIGN PATENT DOCUMENTS

| | | |
|---|---|---|
| JP | 2001-095233 A | 4/2001 |
| JP | 2013-013234 A | 1/2013 |
| JP | 2013-093923 A | 5/2013 |
| JP | 2013-110888 A | 6/2013 |
| JP | 2013-176252 A | 9/2013 |
| JP | 2015180119 A | 10/2015 |
| WO | 2015141348 A1 | 9/2015 |

* cited by examiner

[FIG. 1]
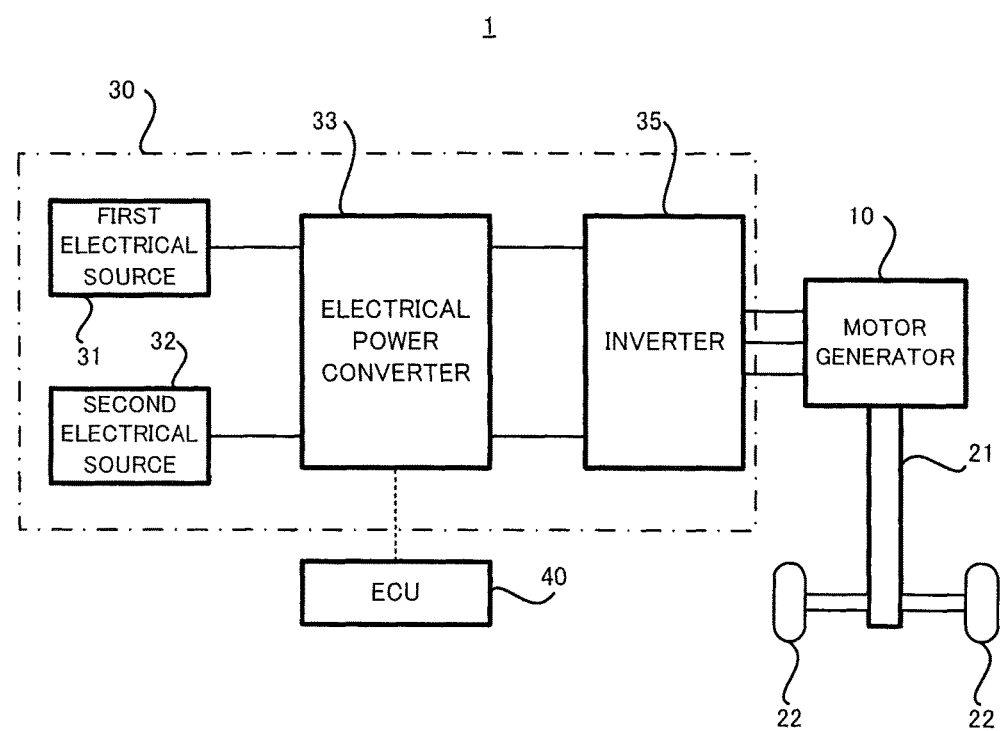

[FIG. 2]
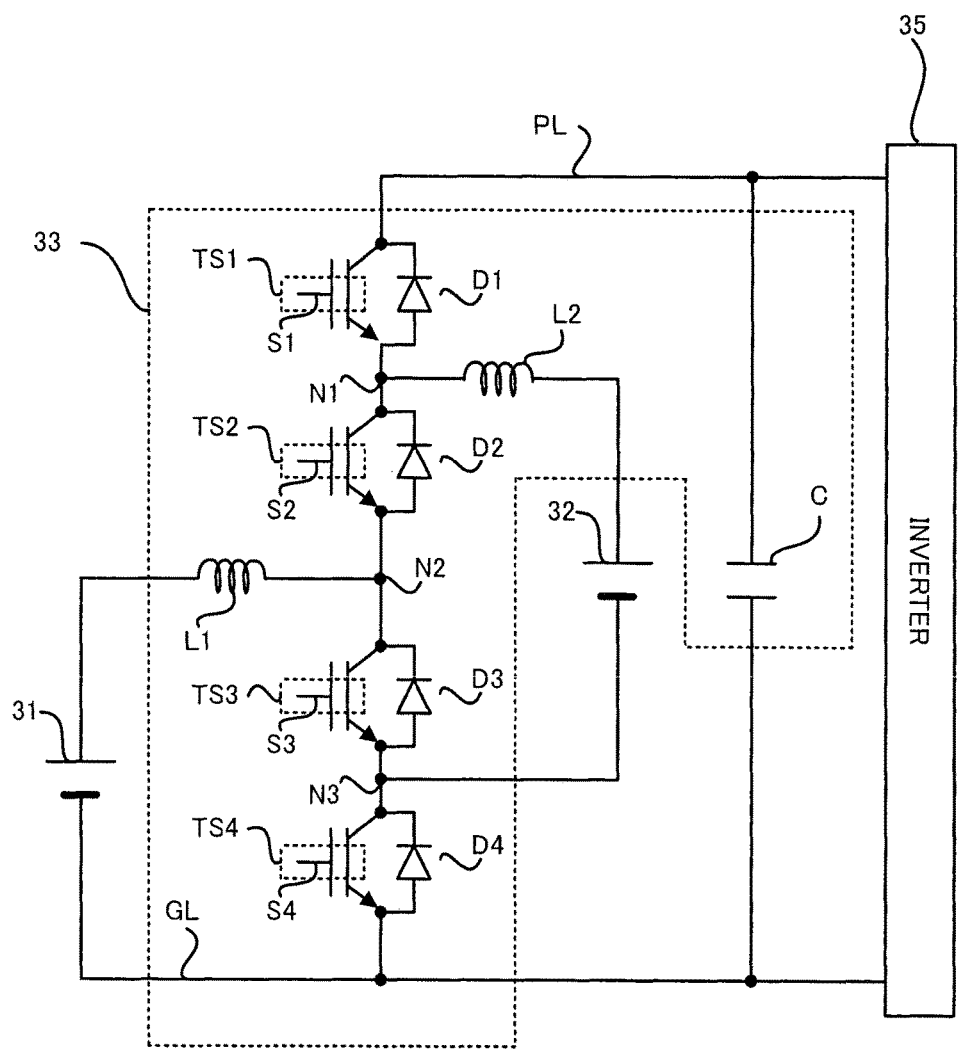

[FIG. 3]
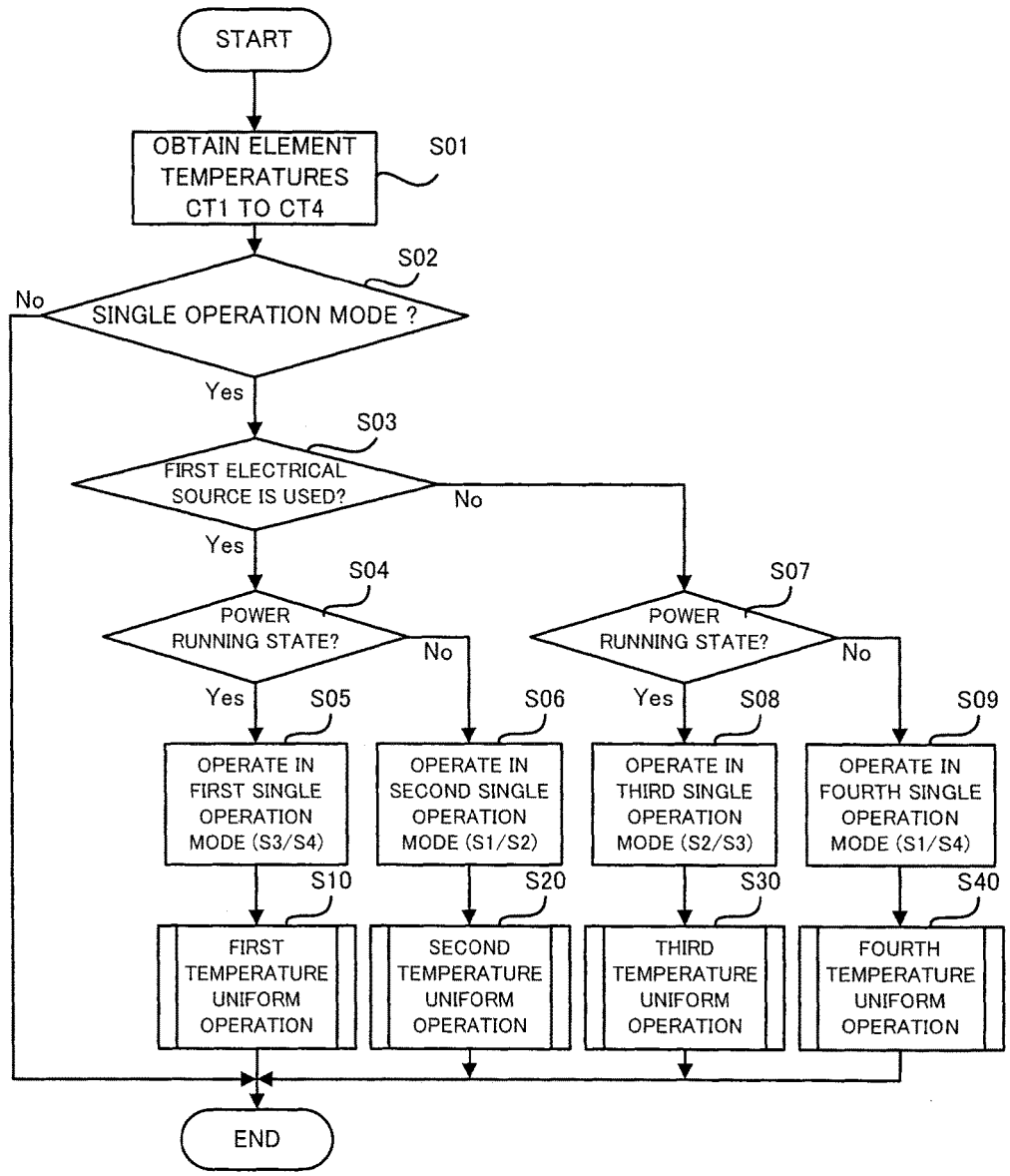

[FIG. 4]
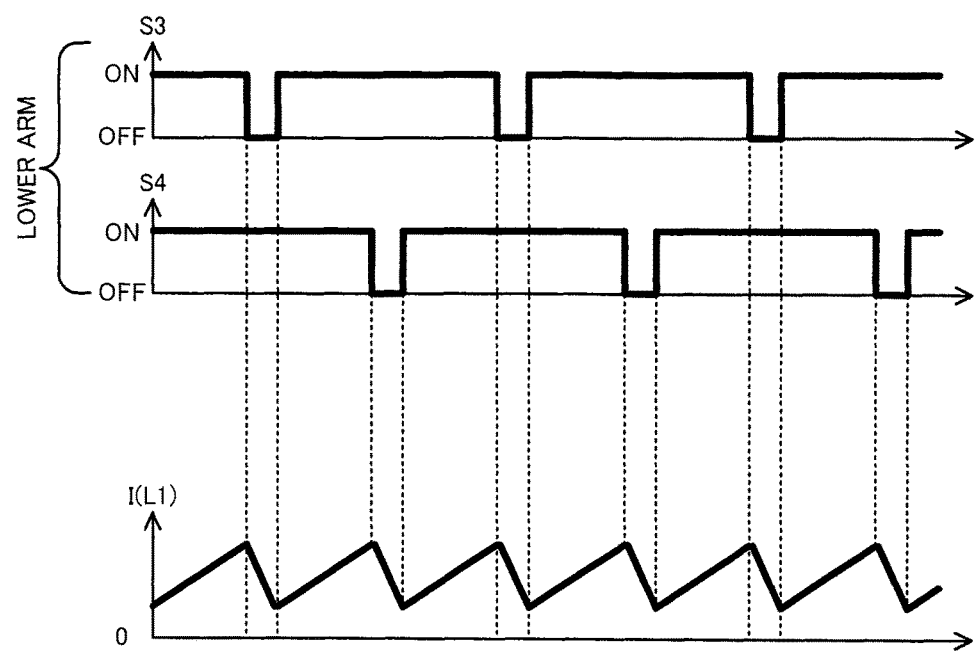

[FIG. 5]
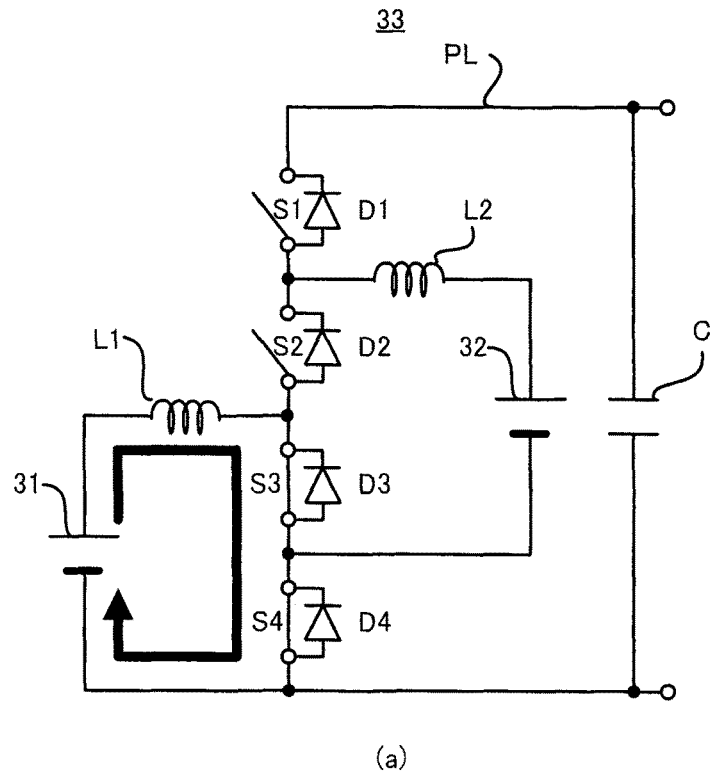
(a)
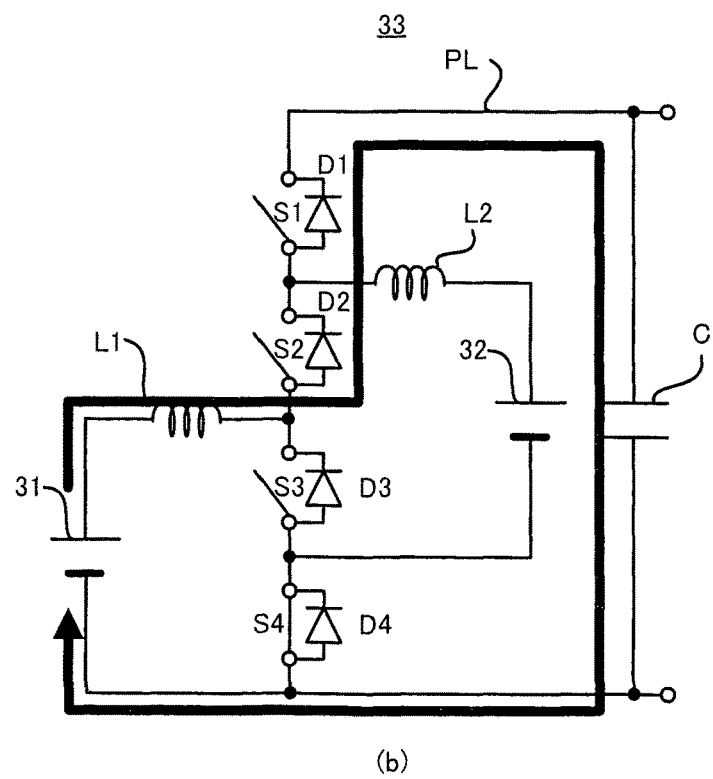
(b)

[FIG. 6]
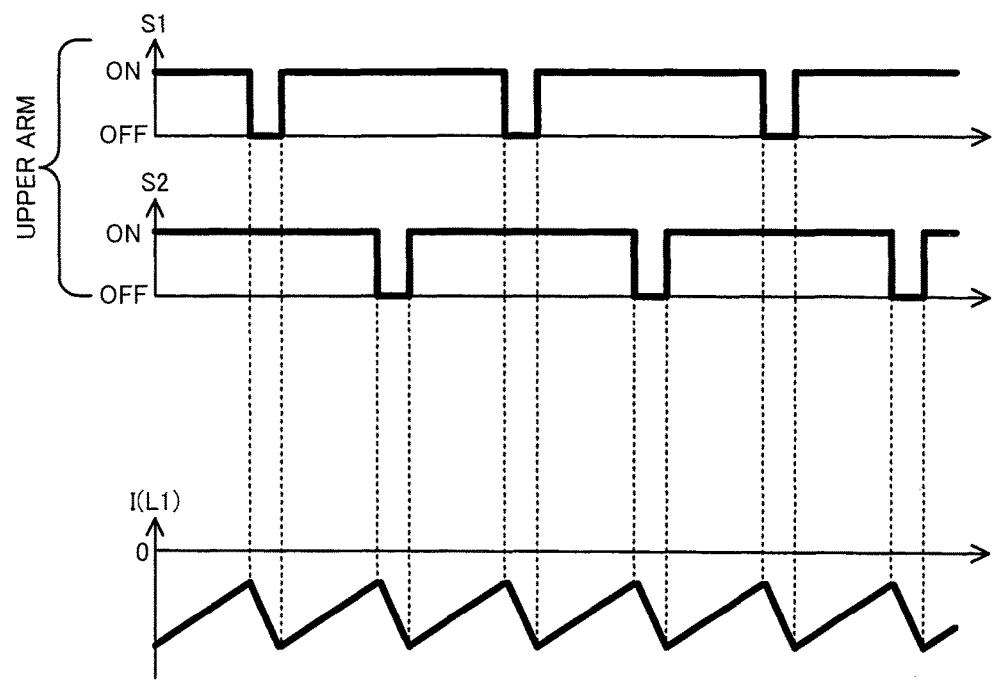

[FIG. 7]
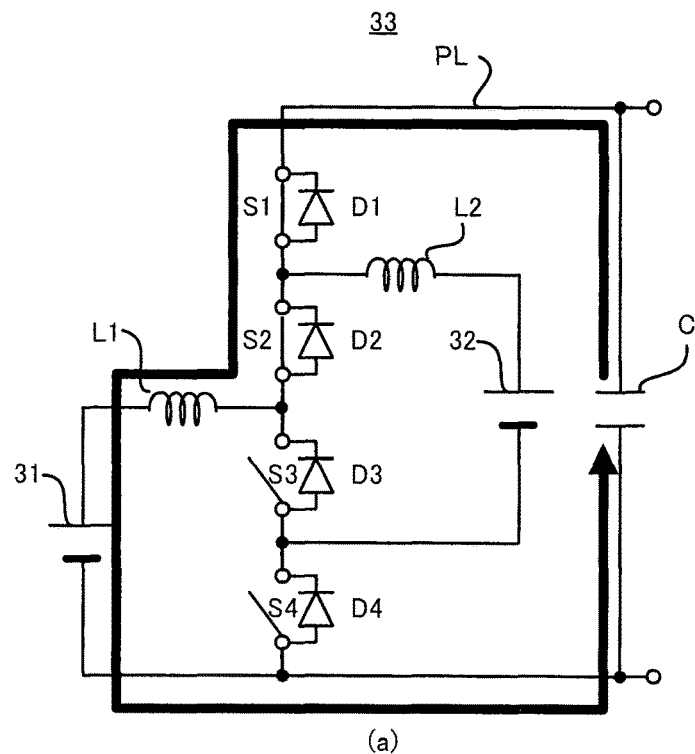
(a)
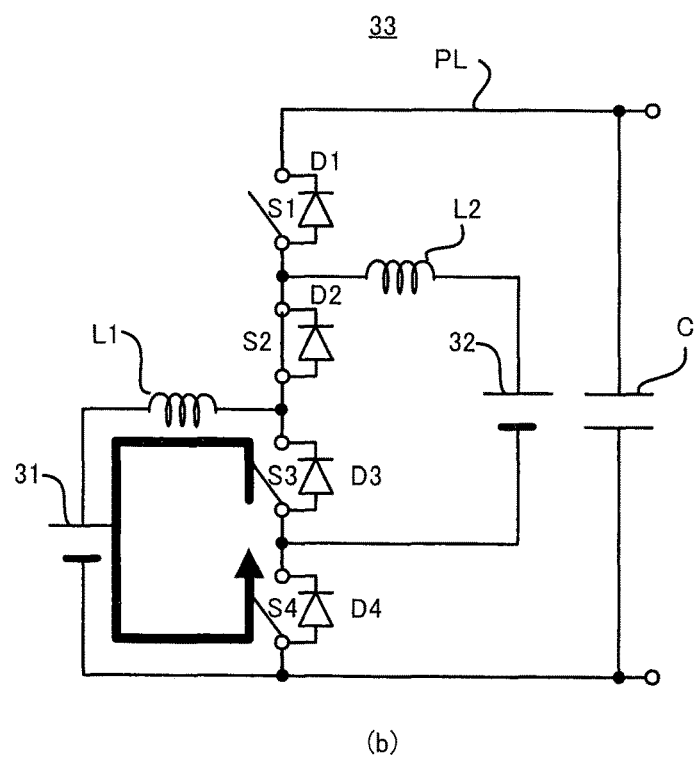
(b)

[FIG. 8]
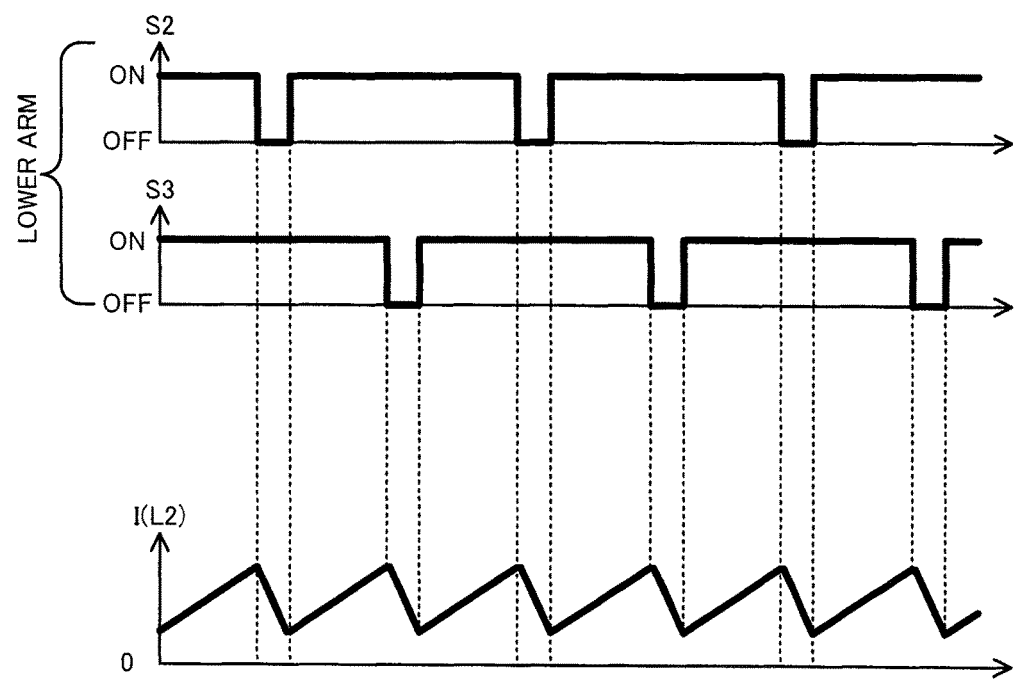

[FIG. 9]
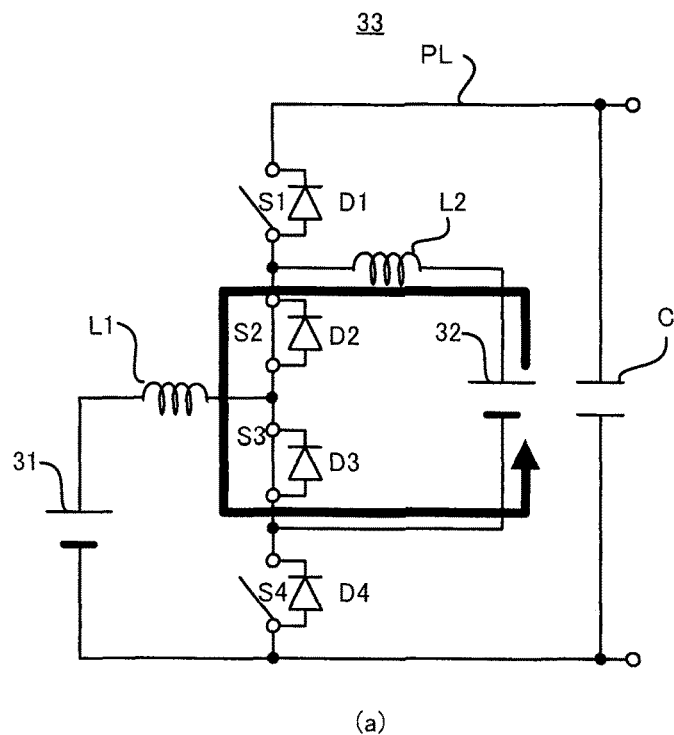
(a)
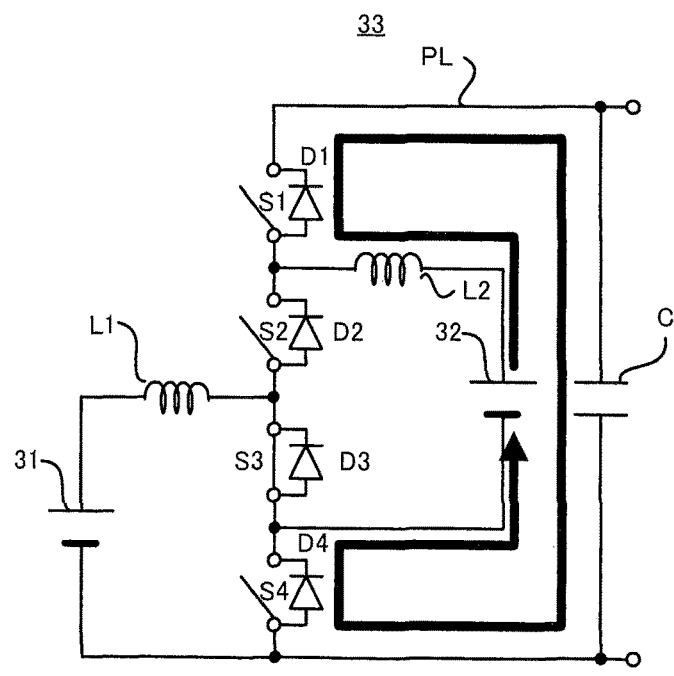
(b)

[FIG. 10]
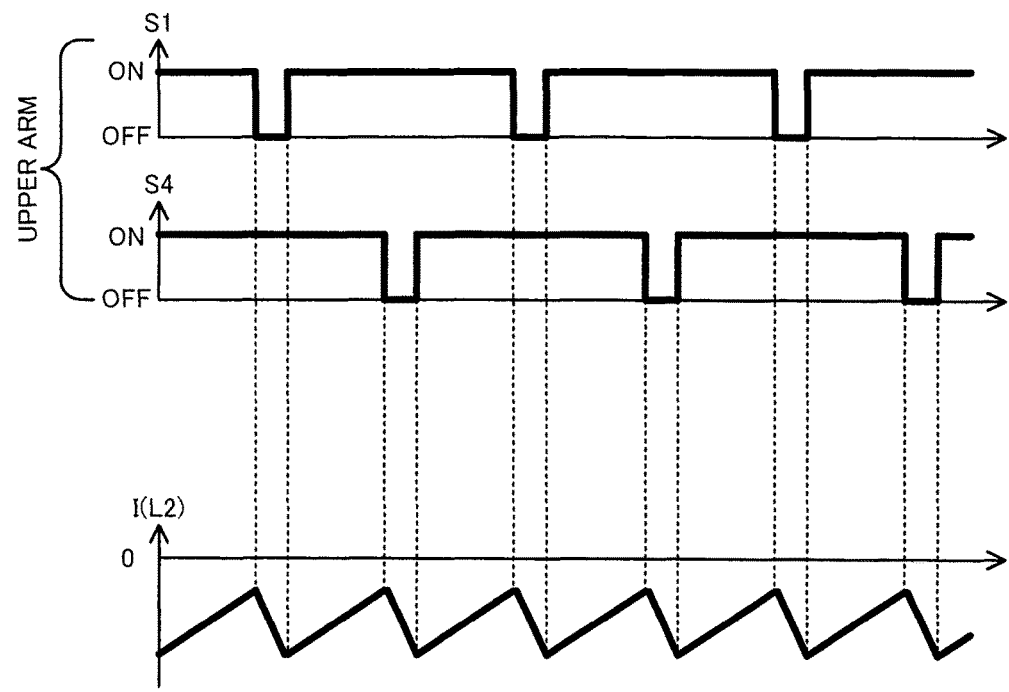

[FIG. 11]
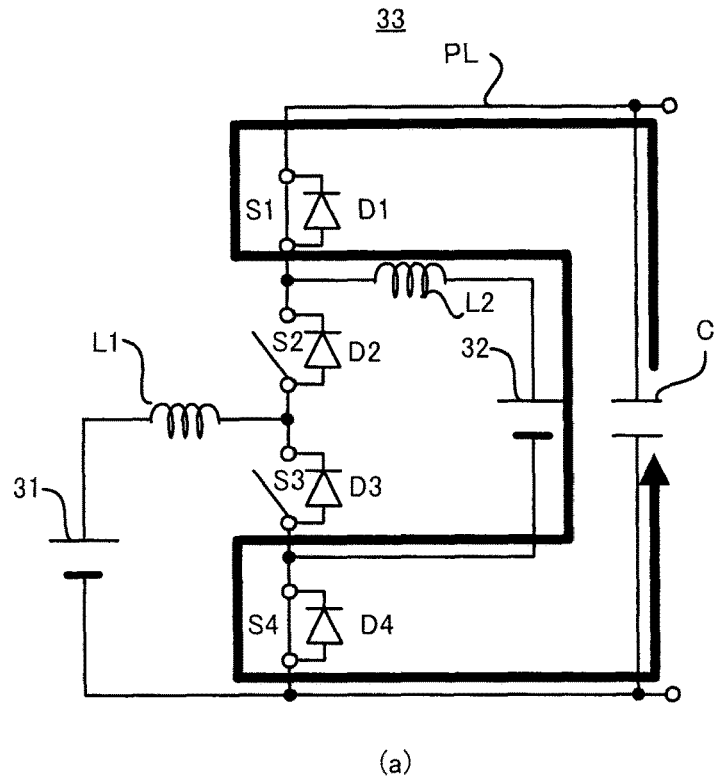
(a)
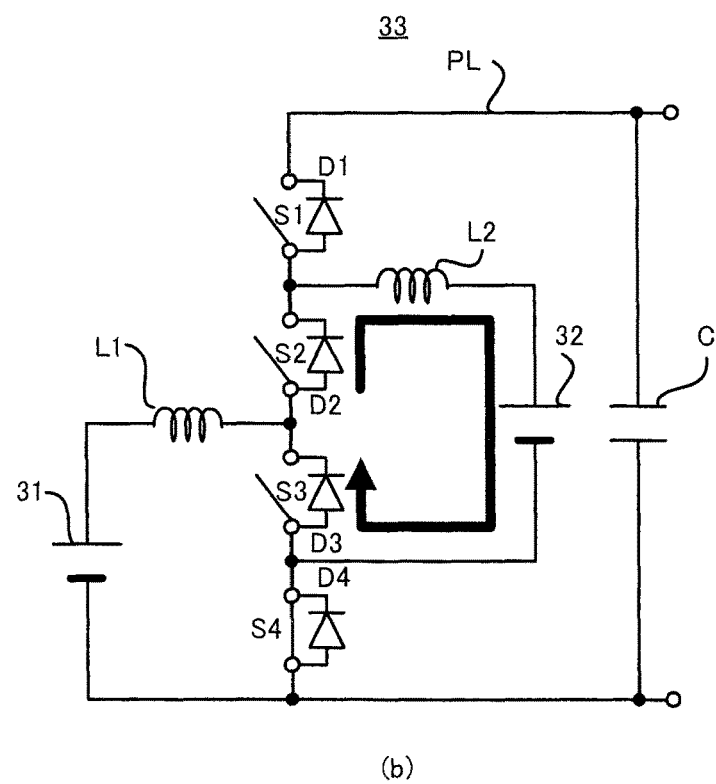
(b)

[FIG. 12]
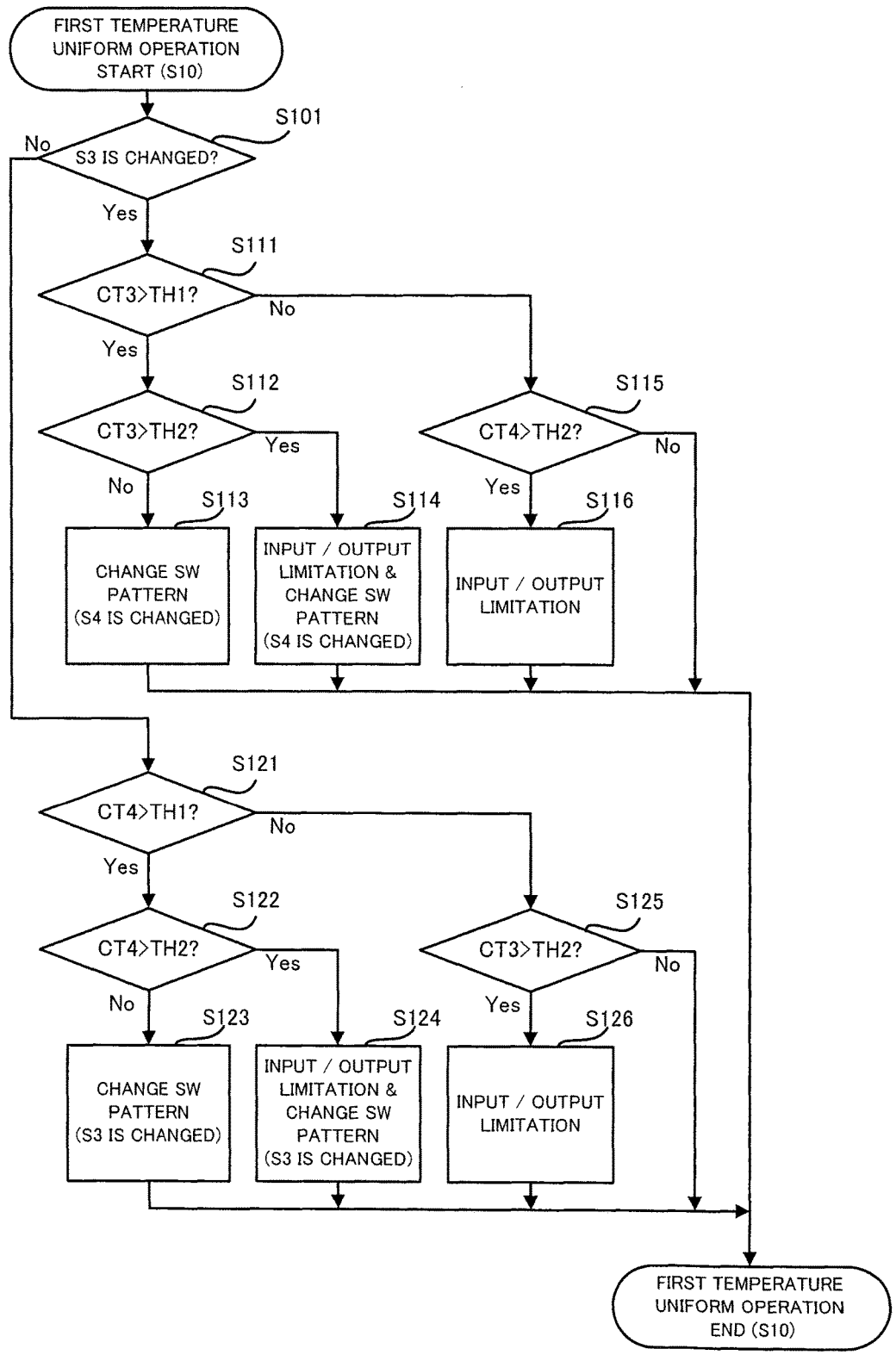

[FIG. 13]
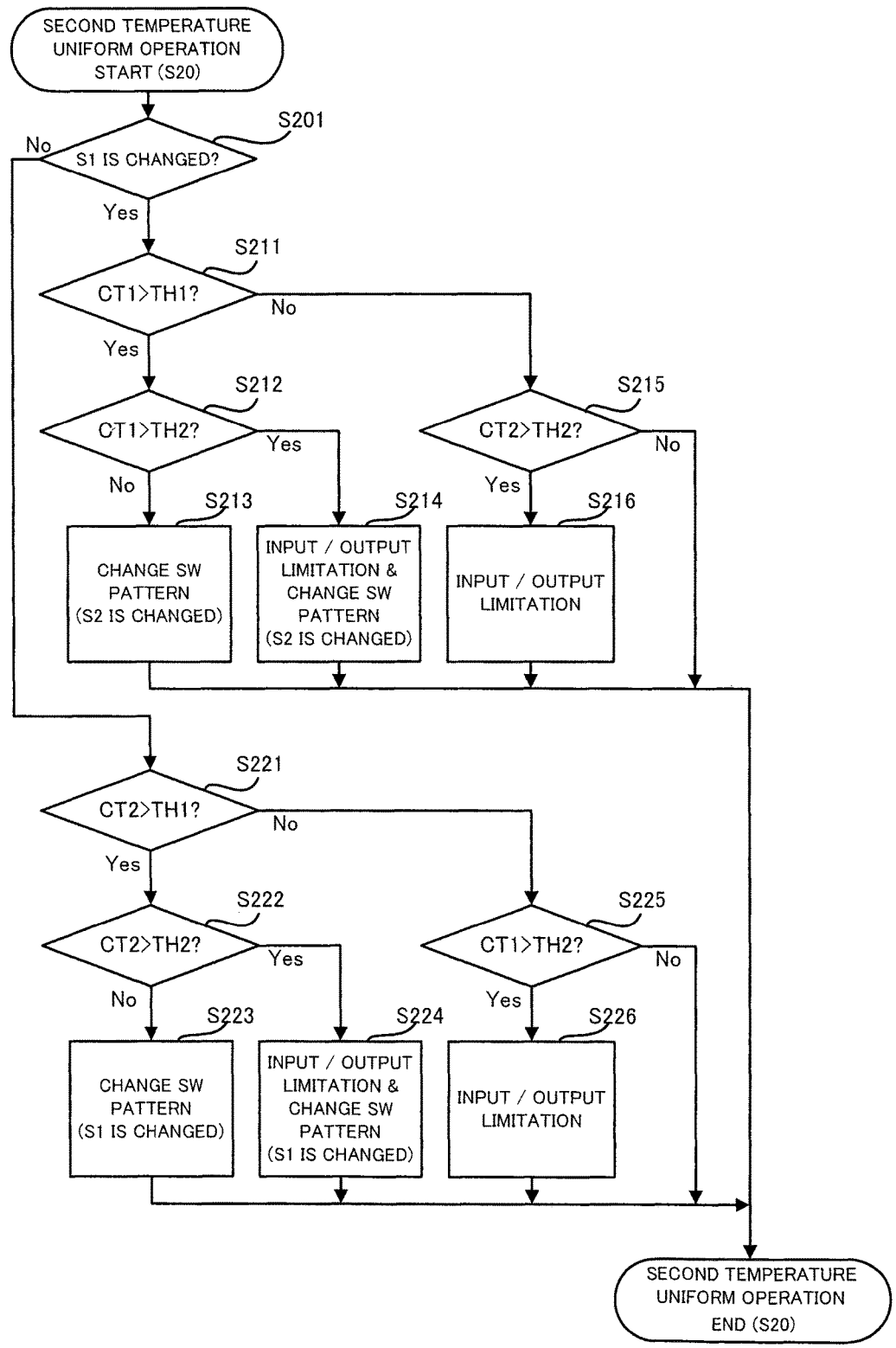

[FIG. 14]
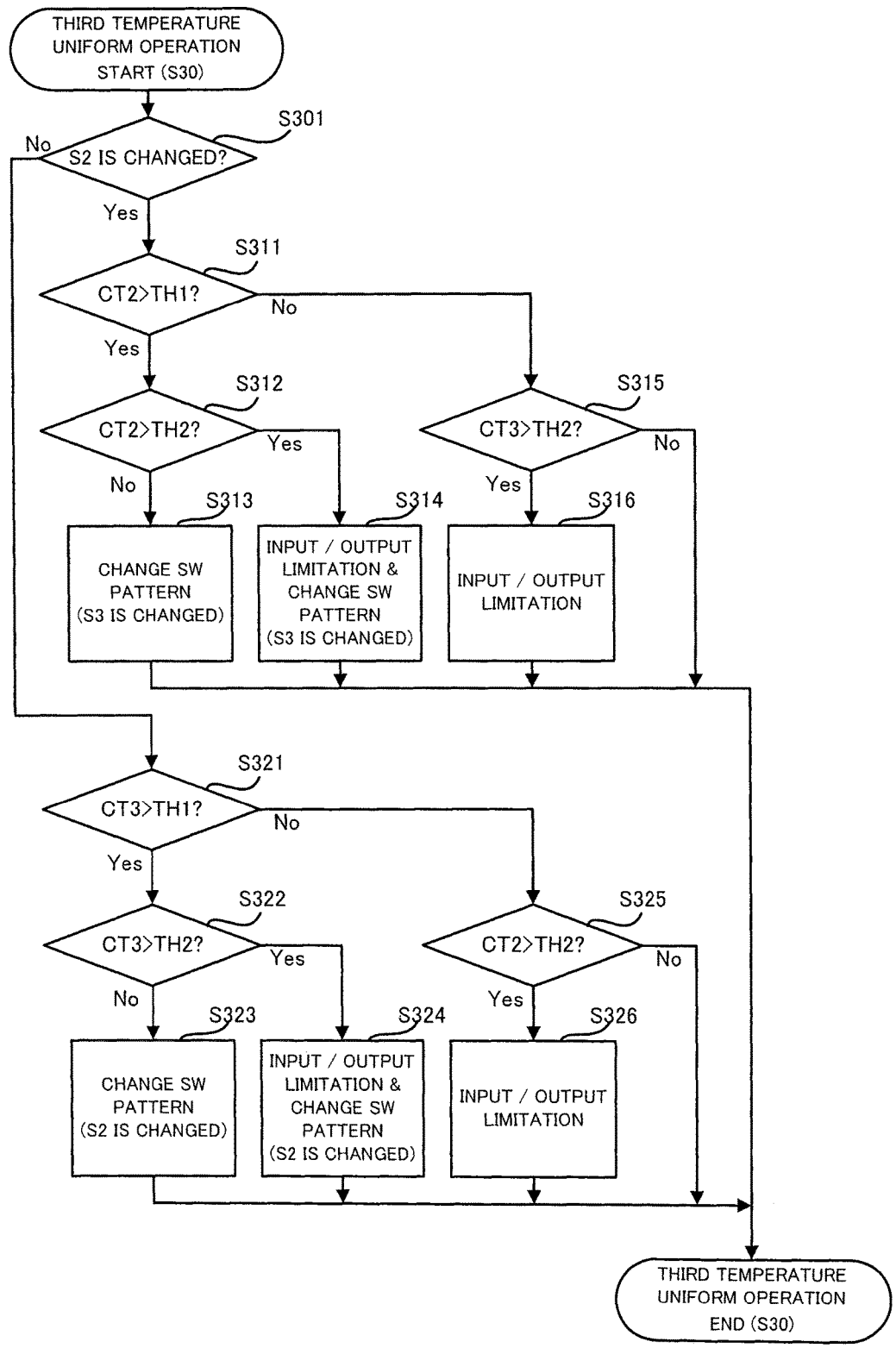

[FIG. 15]
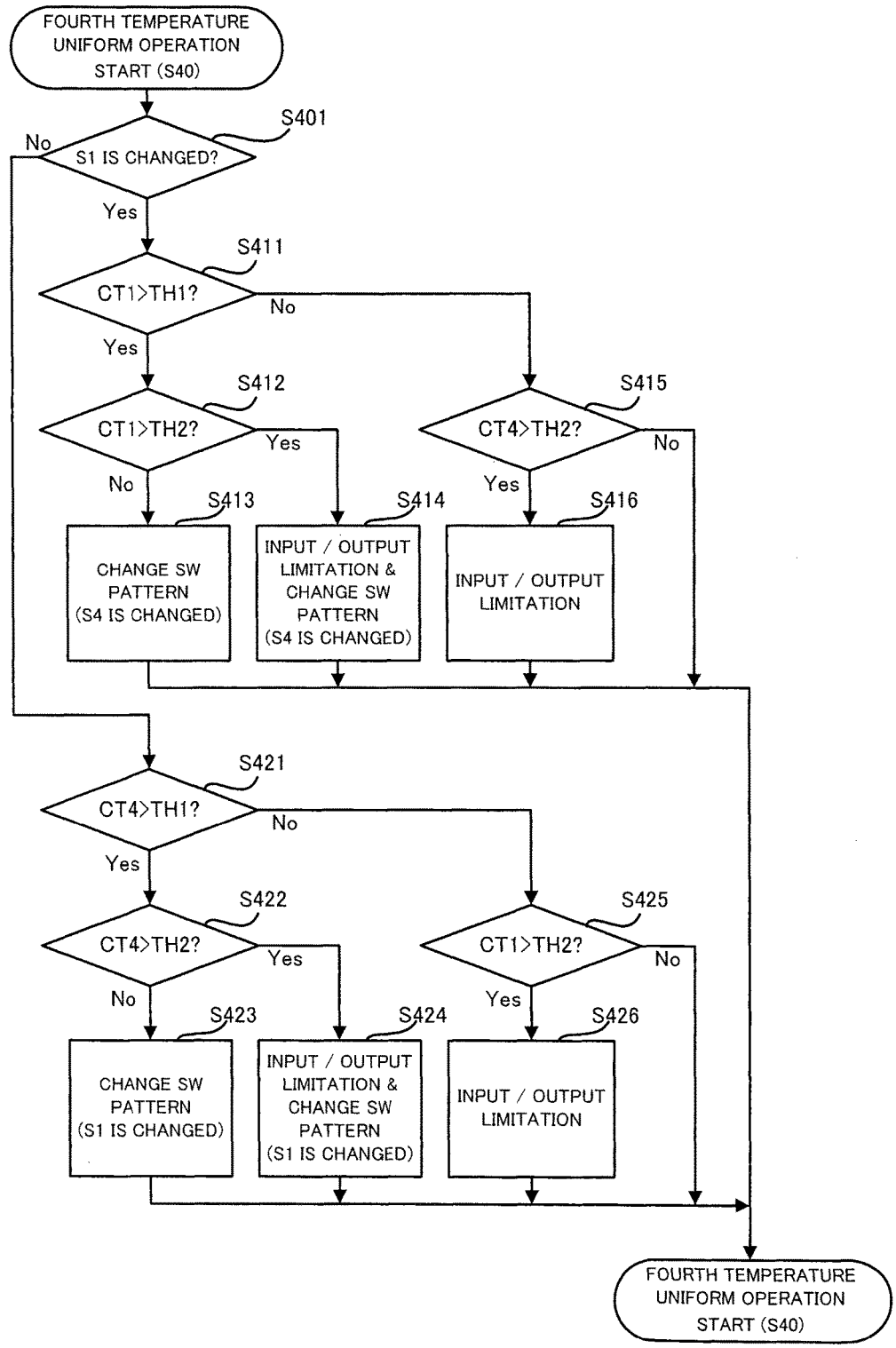

[FIG. 16]
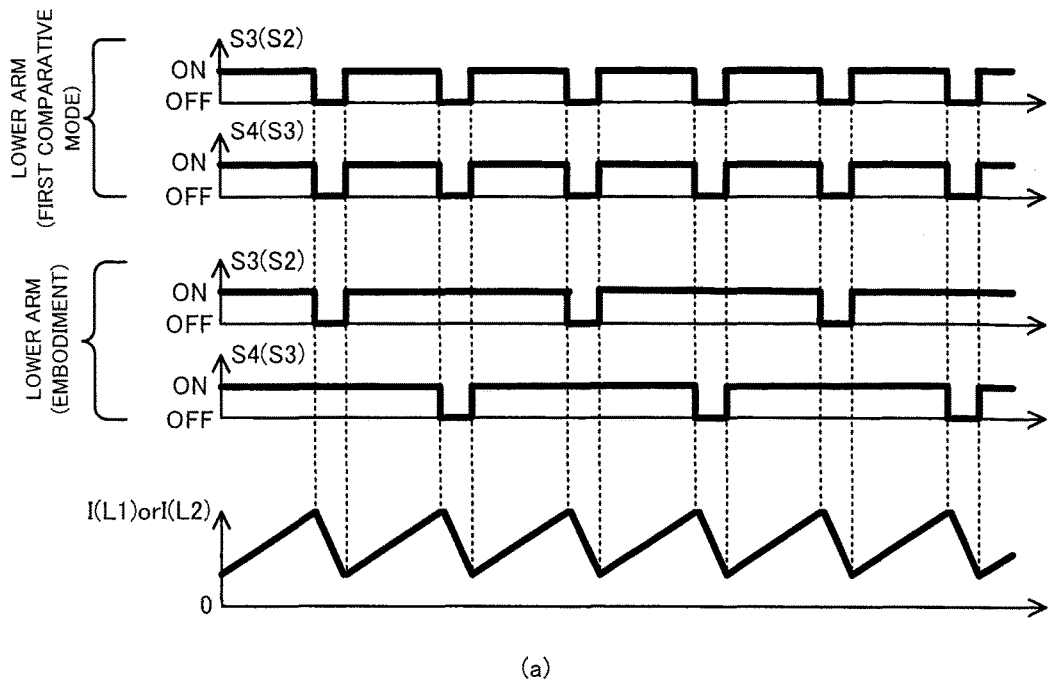
(a)
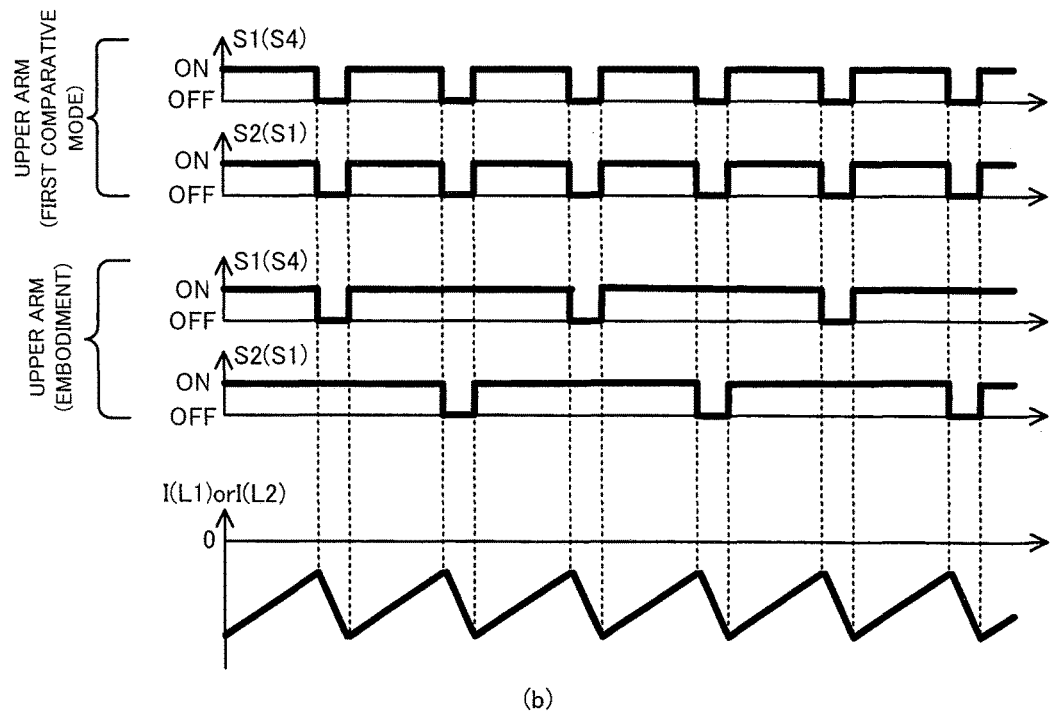
(b)

[FIG. 17]
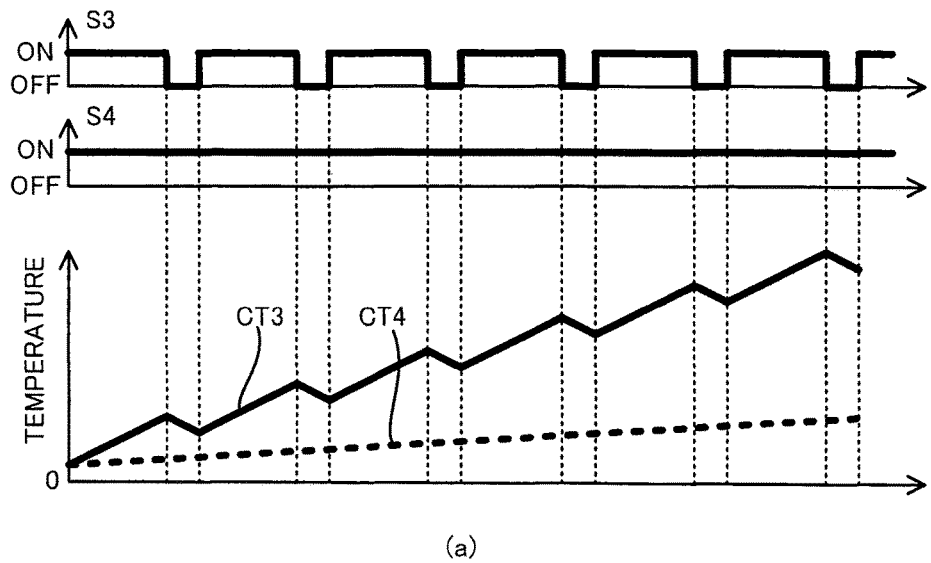
(a)
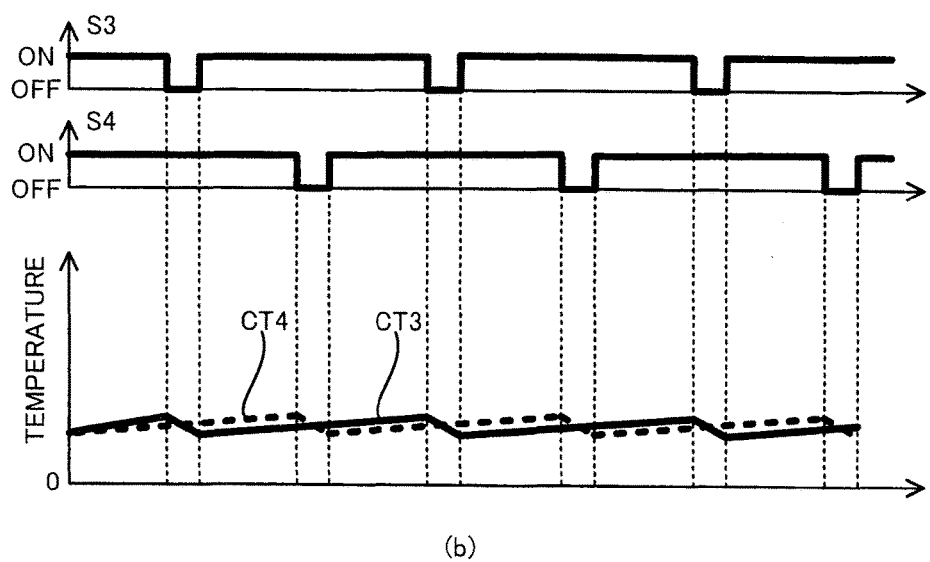
(b)

[FIG. 18]
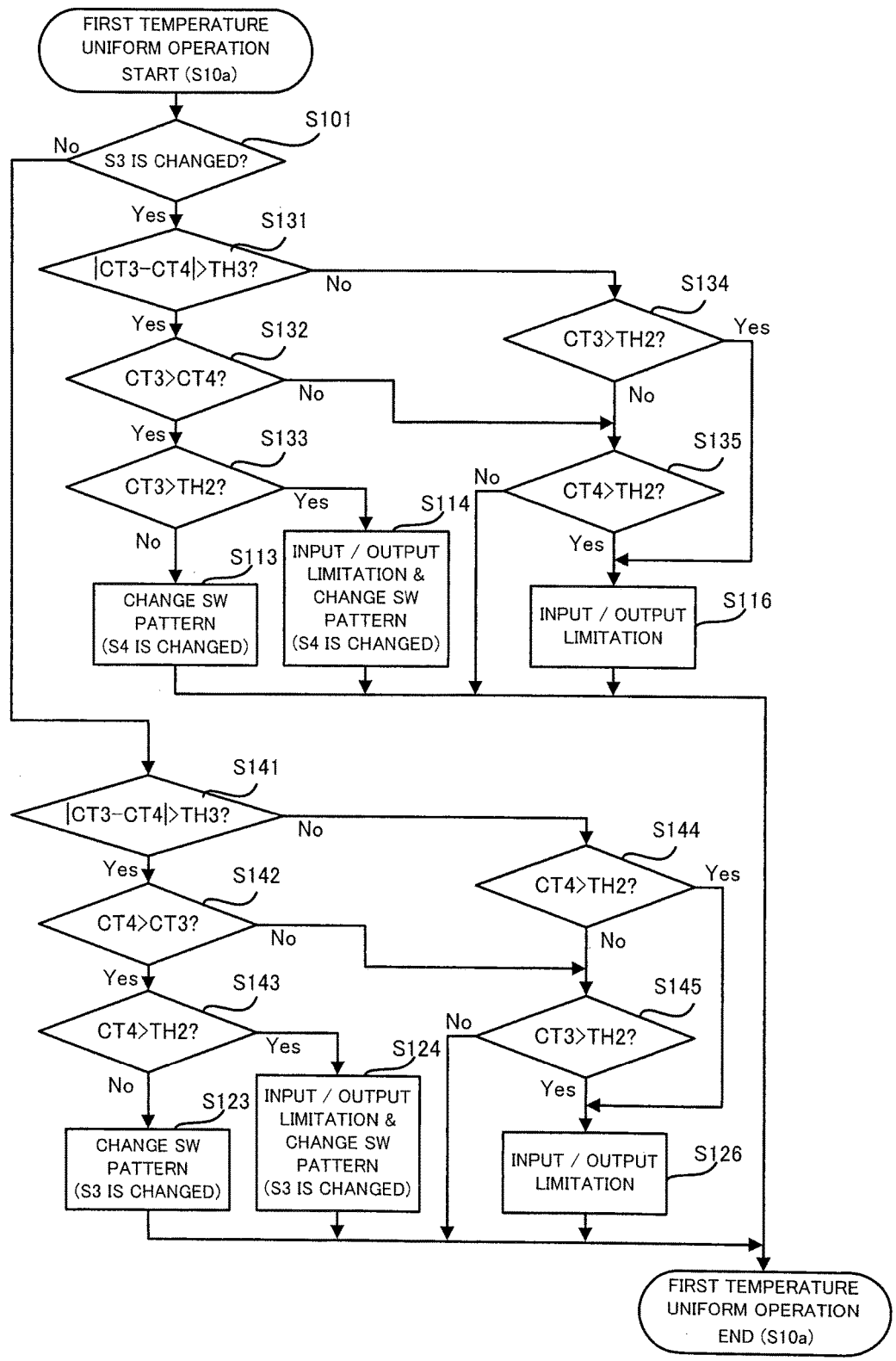

[FIG. 19]
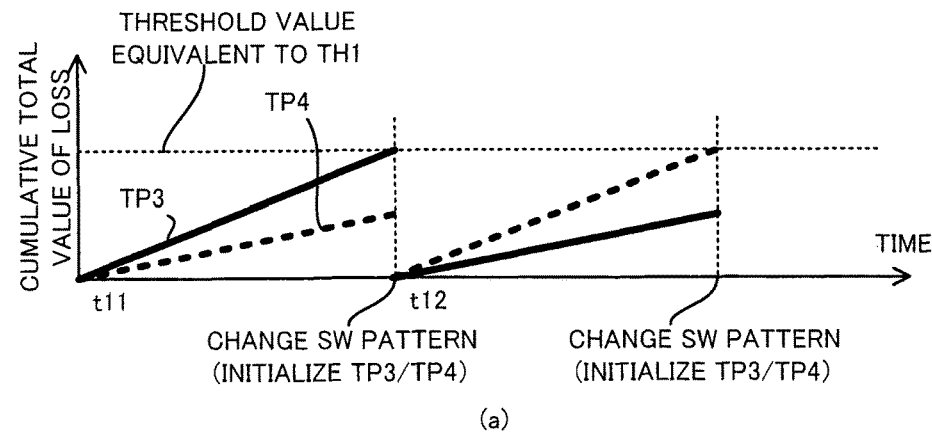
(a)
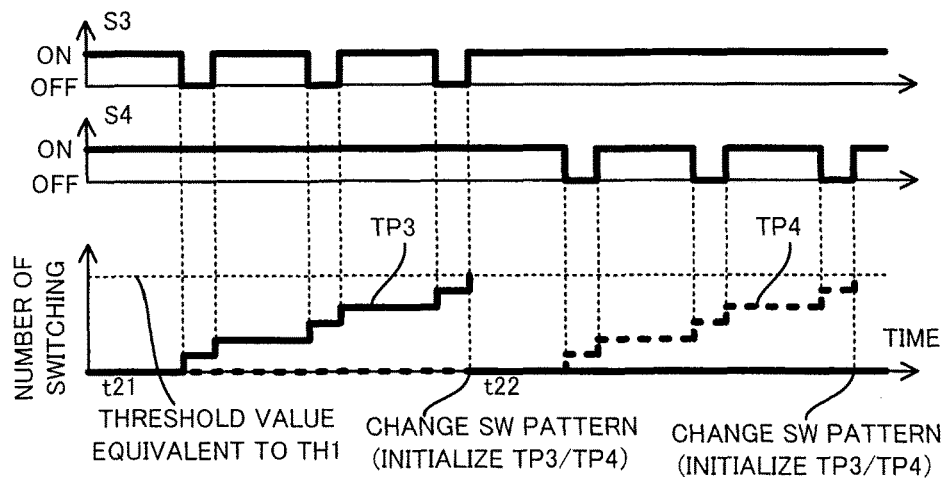
(b)
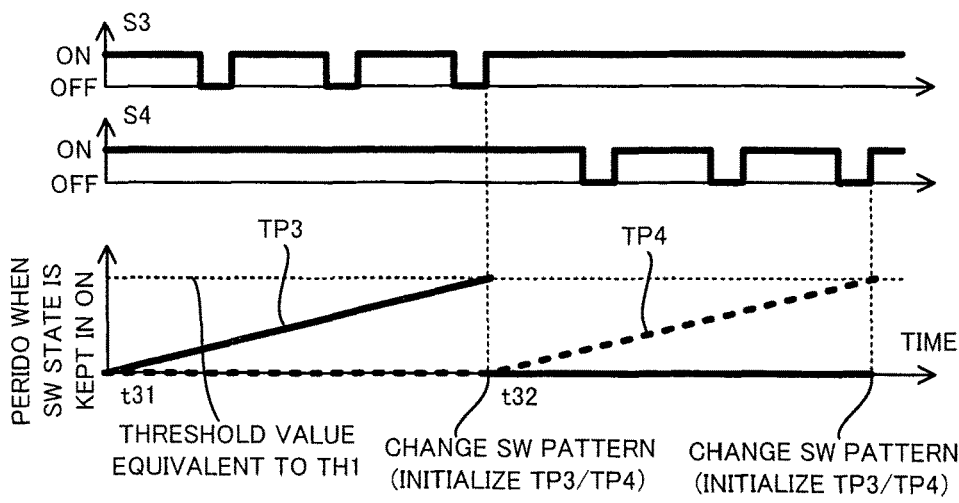
(c)

ELECTRICAL SOURCE CONTROL APPARATUS FOR CONVERTER SWITCH TEMPERATURE CONTROL

CROSS-REFERENCE TO RELATED APPLICATIONS

This is a national phase application based on the PCT International Patent Application No. PCT/JP2015/064666 filed May 15, 2015, claiming priority to Japanese Patent Application No. 2014-104537 filed May 20, 2014, the entire contents of both of which are incorporated herein by reference.

TECHNICAL FIELD

The present invention relates to an electrical source control apparatus which is configured to control an electrical source system having an electrical power converter which is configured to perform an electrical power conversion with an electricity storage apparatus, for example.

BACKGROUND ART

An electrical power converter, which is configured to perform an electrical power conversion with an electricity storage apparatus such as a secondary battery, a capacitor and the like by changing a switching state of switching element, is known. Especially, the electrical power converter which is configured to perform the electrical power conversion with a plurality of electricity storage apparatuses is proposed, as disclosed in a Patent Literature 1. The electrical power converter like this has three or more switching elements which are electrically connected in series as the switching elements which are used to perform the electrical power conversion with the plurality of electricity storage apparatuses. For example, the electrical power converter for a vehicle, which moves by using the electrical power outputted from two electricity storage apparatuses, has four switching elements which are electrically connected in series as the switching elements which are used to simultaneously perform the electrical power conversion with two electricity storage apparatuses.

CITATION LIST

Patent Literature

Patent Literature 1: Japanese Patent Application Laid Open No. 2013-013234

SUMMARY OF INVENTION

Technical Problem

It is preferable that a switching loss in the switching element be reduced in the electrical power converter having the switching element. In the Patent Literature 1, a phase difference between a first carrier signal and a second carrier signal is properly changed to reduce the switching loss, wherein the first carrier signal is used to control the electrical power conversion with a first electricity storage apparatus and the second carrier signal is used to control the electrical power conversion with a second electricity storage apparatus. In this case, an electrical current which flows through the first electricity storage apparatus and an electrical current which flows through the second electricity storage apparatus cancel each other by properly changing the phase difference. As a result, the switching loss is reduced.

The Patent Literature 1 discloses the electrical power converter which is configured to operate in an operation mode by which the electrical power converter simultaneously performs the electrical power conversion with the first electricity storage apparatus and the electrical power conversion with the second electricity storage apparatus. On the other hand, the electrical power converter sometimes operate in an operation mode by which the electrical power converter performs only the electrical power conversion with the first electricity storage apparatus.

However, when the electrical power converter operates in this operation mode, the electrical power converter does not perform the electrical power conversion with the second electricity storage apparatus and thus the electrical current does not flow through the second electricity storage apparatus. Thus, the electrical current which flows through the first electricity storage apparatus and the electrical current which flows through the second electricity storage apparatus do not cancel each other on the switching element. Thus, there is a possibility that a controlling method disclosed in the Patent Literature 1 is not capable of reducing the switching loss.

Even in the case where the electrical power converter performs only the electrical power conversion with the second electricity storage apparatus, there is a possibility that the controlling method disclosed in the Patent Literature 1 is not capable of reducing the switching loss.

The subject to be solved by the present invention discussed herein includes the above as one example. It is therefore an object of the present invention to provide an electrical source control apparatus which is capable of reducing the switching loss of the electrical power converter which operates in the operation mode by which the electrical power converter performs the electrical power conversion with one of the first electricity storage apparatus and the second electricity storage apparatus.

Solution to Problem

<1>

One aspect of an electrical source control apparatus of the present invention is configured to control an electrical source system, the electrical source system has: a first electricity storage apparatus; a second electricity storage apparatus; and an electrical power converter having a plurality of switching elements which are electrical connected in series, each of the plurality of switching elements being located in both of a first electrical power conversion path and a second electrical power conversion path, the first electrical conversion path passing through the first electricity storage apparatus and being used to perform an electrical power conversion with the first electricity storage apparatus, the second electrical conversion path passing through the second electricity storage apparatus and being used to perform an electrical power conversion with the second electricity storage apparatus, the electrical source control apparatus has: a selecting device which is configured to select one switching element from at least two switching elements of the plurality of switching elements, each of the at least two switching elements constitutes predetermined arm element whose switching state should be changed to perform the electrical power conversion with either one of the first and second electricity storage apparatuses, when the electrical power converter performs the electrical power conversion with either one of the first and the second electricity storage apparatuses; and a controlling device which is configured to control the electrical power converter to change a switching state of the selected one switching element while keeping a switching state of another one of the at least two switching elements which is different from the selected one switching element in an ON state, the selecting device newly selects the one switching element to reduce a difference between temperatures of the at least two switching elements compared to the difference in the case where the one switching element is not newly selected, when a temperature of at least one of the at least two switching elements satisfies a predetermined condition.

According to one aspect of the electrical source system of the present invention, the electrical source system which has the first and second electricity storage apparatuses and the electrical power converter can be controlled.

The electrical power converter is capable of performing the electrical power conversion with the first and second electricity storage apparatuses under the control of the electrical source control apparatus. The electrical power converter has the plurality of switching elements to perform the electrical power conversion with the first and second electricity storage apparatuses. Each of the plurality of switching elements is located in the first electrical power conversion path which passes through the first electricity storage apparatus and which is used to perform the electrical power conversion with the first electricity storage apparatus. Moreover, each of the plurality of switching elements is located in the second electrical power conversion path which passes through the second electricity storage apparatus and which is used to perform the electrical power conversion with the second electricity storage apparatus, in addition to the first electrical power conversion path. Moreover, the plurality of switching elements are electrically connected in series. The electrical power converter is capable of performing the electrical power conversion with the first and second electricity storage apparatuses by properly changing the switching states of the plurality of switching elements which are locates as described above.

The electrical power converter is capable of performing the electrical power conversion with either one of the first and second electricity storage apparatuses. For example, when a SOC (State Of Charge) of the other electricity storage apparatus is excessively low or the other electricity storage apparatus is subject to an input limitation (for example, a Win limitation) or an output limitation (for example, a Wout limitation), the electrical power converter is capable of performing the electrical power conversion with either one of the first and second electricity storage apparatuses while not performing the electrical power conversion with the other one of the first and second electricity storage apparatuses.

Especially in this aspect, the electrical source control apparatus has the selecting device and the controlling device in order to control the above described electrical source system.

The selecting device selects one switching element from at least two switching elements each of which constitutes the predetermined arm element. The "predetermined arm element" is a switching element of the plurality of switching elements whose switching state is desired to be changed to perform the electrical power conversion with either one of the first and second electricity storage apparatuses. For example, the predetermined arm element is a lower arm for either one of the first and second electricity storage apparatuses when an electrical power is outputted from either one of the first and second electricity storage apparatuses (namely, either one of the first and second electricity storage apparatuses discharges). On the other hand, the predetermined arm element is an upper arm for either one of the first and second electricity storage apparatuses when an electrical power is inputted to either one of the first and second electricity storage apparatuses (namely, either one of the first and second electricity storage apparatuses is charged).

One switching element which is selected by the selecting device is used as the switching element whose switching state should be changed to perform the electrical power conversion with either one of the first and second electricity storage apparatuses, under the control of the controlling device. On the other hand, another switching element which is different from one switching element which is selected by the selecting device is used as the switching element whose switching state is kept (fixed) in the ON state, under the control of the controlling device. Namely, the controlling device controls the electrical power converter to change the switching state of one switching element which is selected by the selecting device while keeping the switching state of another switching element, which is different from one switching element which is selected by the selecting device, in the ON state.

Since the electrical power converter operates in the above described manner, the number of the switching (the number of the change of the switching state) in this aspect is smaller than the number of the switching in the case where the switching states of all of the at least two switching elements are changed simultaneously or in parallel. Therefore, the switching loss is also reduced due to the reduction of the number of the switching.

Especially in this aspect, the reduction of the number of the switching results in the reduction of the switching loss. Namely, the switching loss is reduced without using cancellation of an electrical current which flows through the first electricity storage apparatus and an electrical current which flows through the second electricity storage apparatus. Therefore, in this aspect, the switching loss is effectively reduced even when the electrical power converter performs the electrical power conversion with either one of the first and second electricity storage apparatuses and does not perform the electrical power conversion with the other one of the first and second electricity storage apparatuses.

Moreover, in this aspect, the selecting device selects one switching element so as to reduce (decrease) the difference between the temperatures of at least two switching elements each of which constitutes the predetermined arm element. More specifically, the selecting device newly selects one switching element such that the difference between the temperatures of at least two switching elements each of which constitutes the predetermined arm element in the case where the one switching element is newly selected is smaller than the difference in the case where the one switching element is not newly selected. It is preferable that the selecting device newly selects one switching element when the temperature of at least one of at least two switching elements each of which constitutes the predetermined arm element satisfies the predetermined condition.

As a result, the electrical power converter is capable of operating to change the switching state of one switching element which is newly selected by the selecting device, instead of changing the switching state of one switching element which is previously selected by the selecting device. Namely, the electrical power converter is capable of properly changing the switching element whose switching state should be changed to reduce the difference between the temperatures of at least two switching elements each of which constitutes the predetermined arm element. As a result, the difference between the temperatures of at least two switching elements each of which constitutes the predetermined arm element becomes smaller (for example, becomes smaller than a predetermined amount). Thus, an excessive increase of the temperature of either one of at least two switching elements each of which constitutes the predetermined arm element can be appropriately prevented (suppressed). In other words, the temperatures of at least two switching elements each of which constitutes the predetermined arm element can be even (in other words, an excessive variation of the temperatures can be prevented). As a result, the input limitation or the output limitation, which is caused by the excessive increase of the temperature of either one of at least two switching elements each of which constitutes the predetermined arm element, can be prevented.

<2>

In another aspect of the above described electrical source control apparatus, the selecting device newly selects the one switching element when the temperature of the currently selected one switching element is larger than a first threshold value.

According to this aspect, the selecting device newly selects one switching element on the basis of the predetermined condition for the temperature of the currently selected one switching element. Namely, the selecting device newly selects one switching element when the predetermined condition that the temperature of the currently selected one switching element is larger than the first threshold value is satisfied.

The temperature of the switching element whose switching state is changed increases more easily than the temperature of the switching element whose switching state is kept in the ON state. Namely, the temperature of the currently selected one switching element increases more easily than the temperature of another switching element which is different from the currently selected one switching element. As a result, there is a relatively high possibility that the temperature of the currently selected one switching element is larger (namely, higher) than the temperature of another switching element which is different from the currently selected one switching element. Therefore, if one switching element is not newly selected (namely, the switching state of the currently selected one switching element continues to be changed), the temperature of the currently selected one switching element may increase excessively.

However, in this aspect, since the one switching element is newly selected when the temperature of the currently selected one switching element is larger than the first threshold value, the excessive increase of the temperature of the currently selected one switching element is appropriately prevented. Namely, the excessive increase of the temperature of either one of at least two switching elements each of which constitutes the predetermined arm element can be appropriately prevented. As a result, the difference between the temperatures of at least two switching elements each of which constitutes the predetermined arm element becomes relatively smaller. Namely, the temperatures of at least two switching elements each of which constitutes the predetermined arm element can be even.

<3>

In another aspect of the above described electrical source control apparatus, the selecting device newly selects the one switching element when the difference between the temperatures of the at least two switching elements is larger than a second threshold value According to this aspect, the selecting device newly selects one switching element on the basis of the predetermined condition for the difference between the temperatures of at least two switching elements each of which constitutes the predetermined arm element. Namely, the selecting device newly selects one switching element when the predetermined condition that the difference between the temperatures of at least two switching elements each of which constitutes the predetermined arm element is larger than the second threshold value is satisfied. As a result, the excessive increase of the temperature of the currently selected one switching element (alternatively, either one of at least two switching elements each of which constitutes the predetermined arm element) can be appropriately prevented. As a result, the difference between the temperatures of at least two switching elements each of which constitutes the predetermined arm element becomes relatively smaller. Namely, the temperatures of at least two switching elements each of which constitutes the predetermined arm element can be even.

<4>

In another aspect of the above described electrical source control apparatus, the selecting device newly selects the one switching element such that the difference between the temperatures of the at least two switching elements when the switching state of the newly selected one switching element is changed is smaller than the difference between the temperatures of the at least two switching elements when the switching state of the currently selected one switching element continues to be changed According to this aspect, the excessive increase of the temperature of the currently selected one switching element (alternatively, either one of at least two switching elements each of which constitutes the predetermined arm element) can be appropriately prevented. As a result, the difference between the temperatures of at least two switching elements each of which constitutes the predetermined arm element becomes relatively smaller. Namely, the temperatures of at least two switching elements each of which constitutes the predetermined arm element can be even.

<5>

In another aspect of the above described electrical source control apparatus, when the temperature of a first switching element of the at least two switching element is larger than a first threshold value under the situation where the first switching element is selected as the one switching element, the selecting device newly selects, as the one switching element, a second switching element of the at least two switching element which is different from the first switching element.

According to this aspect, the selecting device newly selects one switching element on the basis of the predetermined condition for the temperature of the currently selected one switching element. Namely, the selecting device newly selects one switching element when the predetermined condition that the temperature of the first switching element which is currently selected as one switching element is larger than the first threshold value is satisfied. When the above described predetermined condition is satisfied, the second switching element which is different from the first switching element is newly selected as new one switching element. As a result, the electrical power converter is capable of operating to change the switching state of the second switching element, instead of changing the switching state of the first switching element. Thus, the excessive increase of the temperature of the first switching element which is currently selected as one switching element (alternatively, either one of at least two switching elements each of which constitutes the predetermined arm element) can be appropriately prevented. As a result, the difference between the temperatures of at least two switching elements each of which constitutes the predetermined arm element becomes relatively smaller. Namely, the temperatures of at least two switching elements each of which constitutes the predetermined arm element can be even.

<6>

In another aspect of the above described electrical source control apparatus, when the difference between the temperatures of the at least two switching element is larger than a second threshold value under the situation where a first switching element of the at least two switching element is selected as the one switching element, the selecting device newly selects, as the one switching element, a second switching element of the at least two switching element which is different from the first switching element.

According to this aspect, the selecting device newly selects one switching element on the basis of the predetermined condition for the difference between the temperatures of at least two switching elements each of which constitutes the predetermined arm element. Namely, the selecting device newly selects one switching element when the predetermined condition that the difference between the temperatures of at least two switching elements each of which constitutes the predetermined arm element is larger than the second threshold value is satisfied. When the above described predetermined condition is satisfied, the second switching element which is different from the first switching element is newly selected as new one switching element. As a result, the electrical power converter is capable of operating to change the switching state of the second switching element, instead of changing the switching state of the first switching element. Thus, the excessive increase of the temperature of the first switching element which is currently selected as one switching element (alternatively, either one of at least two switching elements each of which constitutes the predetermined arm element) can be appropriately prevented. As a result, the difference between the temperatures of at least two switching elements each of which constitutes the predetermined arm element becomes relatively smaller. Namely, the temperatures of at least two switching elements each of which constitutes the predetermined arm element can be even.

<7>

In another aspect of the above described electrical source control apparatus which newly selects the one switching element when the temperature of the first switching element is larger than the first threshold value or the difference between the temperatures of the at least two switching elements each of which constitutes the predetermined arm element is larger than the second threshold value, the selecting device newly selects, as the one switching element, the second switching element such that the difference between the temperatures of the at least two switching elements when the switching state of the second switching element is changed is smaller than the difference between the temperatures of the at least two switching elements when the switching state of the first switching element continues to be changed.

According to this aspect, the excessive increase of the temperature of the currently selected one switching element (alternatively, either one of at least two switching elements each of which constitutes the predetermined arm element) can be appropriately prevented. As a result, the difference between the temperatures of at least two switching elements each of which constitutes the predetermined arm element becomes relatively smaller. Namely, the temperatures of at least two switching elements each of which constitutes the predetermined arm element can be even.

<8>

In another aspect of the above described electrical source control apparatus, the electrical source control apparatus further has a limiting device which is configured to perform at least one of an input limitation and an output limitation, when the temperature of at least one of the at least two switching elements is larger than a third threshold value, wherein the input limitation limits the electrical power which is inputted to the electrical source system and the output limitation limits the electrical power which is outputted from the electrical source system.

According to this aspect, if the temperature of at least one of at least two switching elements each of which constitutes the predetermined arm element excessively increases, the input limitation or the output limitation is performed for the electrical source system. Thus, the electrical source system can be appropriately protected.

<9>

In another aspect of the above described electrical source control apparatus, the electrical source control apparatus further has an obtaining device which is configured to obtain a temperature characteristic value which directly or indirectly represents the temperatures of the at least two switching elements, the selecting device newly selects the one switching element on the basis of the temperature characteristic value which is obtained by the obtaining device.

According to this aspect, the selecting device is capable of newly selecting one switching element on the basis of the temperature characteristic value which is obtained by the obtaining device to reduce the difference between the temperatures of at least two switching elements each of which constitutes the predetermined arm element. For example, the selecting device is capable of newly selecting one switching element, when the temperature characteristic value represents (indicates) that the temperature of at least one of at least two switching elements each of which constitutes the predetermined arm element satisfies the predetermined condition. For example, the selecting device is capable of newly selecting one switching element, when the temperature characteristic value represents (indicates) that the temperature of the currently selected one switching element is larger than the first threshold value. For example, the selecting device is capable of newly selecting one switching element, when the temperature characteristic value represents (indicates) that the difference between the temperatures of at least two switching elements each of which constitutes the predetermined arm element is larger than the second threshold value.

<10>

In another aspect of the above described electrical source control apparatus which obtains the temperature characteristic value, the temperature characteristic value includes at least one of: an output value of a temperature sensor which detects the temperature of at least one of the at least two switching elements; a switching loss of at least one of the at least two switching elements; a number of the switching of the one switching element; and a period during which the another one of the at least two switching elements is kept in the ON state According to this aspect, the selecting device is capable of newly selecting one switching element on the basis of at least one of the output value of the temperature sensor, the switching loss, the number of the switching and the period during which the switching state is kept in the ON state to reduce the difference between the temperatures of at least two switching elements each of which constitutes the predetermined arm element.

Incidentally, the output value of the temperature sensor represents the temperature of the switching element. The switching loss represents the temperature of the switching element, because there is a high possibility that the temperature of the switching element increases as the switching loss becomes larger. The number of the switching represents the temperature of the switching element, because there is a high possibility that the temperature of the switching element increases as the number of the switching becomes larger. The period during which the switching state is kept in the ON state represents the temperature of the switching element, because there is a high possibility that the temperature of the switching element whose switching state is not kept in the ON state (namely, whose switching state is changed) increases as the period during which the switching state is kept in the ON state becomes longer.

An operation and another advantage of the present invention will become more apparent from the embodiments explained below. The object and advantages of the present invention will be realized and attained by means of the elements and combinations particularly pointed out in the claims. It is to be understood that both the foregoing general description and the following detailed description are exemplary and explanatory and are not restrictive of the embodiment, as claimed.

BRIEF DESCRIPTION OF DRAWINGS

FIG. 1 is a block diagram illustrating a structure of a vehicle of a present embodiment.

FIG. 2 is a circuit diagram illustrating a circuit structure of an electrical power converter.

FIG. 3 is a flowchart illustrating a flow of the operation of the electrical power converter.

FIG. 4 is a timing chart which illustrates switching states of switching elements and an electrical current which flows through a reactor under a situation where the electrical power converter operates in a first single operation mode.

Each of FIG. 5($a$) and FIG. 5($b$) is a circuit diagram which illustrates an electrical current path in the electrical power converter under the situation where the electrical power converter operates in the first single operation mode.

FIG. 6 is a timing chart which illustrates switching states of switching elements and an electrical current which flows through a reactor under a situation where the electrical power converter operates in a second single operation mode.

Each of FIG. 7($a$) and FIG. 7($b$) is a circuit diagram which illustrates an electrical current path in the electrical power converter under the situation where the electrical power converter operates in the second single operation mode.

FIG. 8 is a timing chart which illustrates switching states of switching elements and an electrical current which flows through a reactor under a situation where the electrical power converter operates in a third single operation mode.

Each of FIG. 9($a$) and FIG. 9($b$) is a circuit diagram which illustrates an electrical current path in the electrical power converter under the situation where the electrical power converter operates in the third single operation mode.

FIG. 10 is a timing chart which illustrates switching states of switching elements and an electrical current which flows through a reactor under a situation where the electrical power converter operates in a fourth single operation mode.

Each of FIG. 11($a$) and FIG. 11($b$) is a circuit diagram which illustrates an electrical current path in the electrical power converter under the situation where the electrical power converter operates in the fourth single operation mode.

FIG. 12 is a flowchart illustrating a flow of the first temperature uniform operation.

FIG. 13 is a flowchart illustrating a flow of the second temperature uniform operation.

FIG. 14 is a flowchart illustrating a flow of the third temperature uniform operation.

FIG. 15 is a flowchart illustrating a flow of the fourth temperature uniform operation.

Each of FIG. 16($a$) and FIG. 16($b$) is a timing chart which illustrates the switching states of the switching elements when the electrical power converter operates in the above described first, second, third or fourth single operation mode and the switching states of the switching elements when the electrical power converter operates in a first comparative operation mode by which the switching states of two switching elements each of which is the upper arm or the lower arm are changed simultaneously.

FIG. 17($a$) is a timing chart which illustrates the switching states of the switching elements and the element temperatures when the electrical power converter 33 operates in a second comparative operation mode by which the switching pattern is not changed regardless of the element temperatures, and FIG. 17($b$) is a timing chart which illustrates the switching states of the switching elements when the first temperature uniform operation is performed.

FIG. 18 is a flowchart illustrating a flow of the modified example of the first temperature uniform operation.

Each of FIG. 19($a$) to FIG. 19($c$) is a timing chart illustrating one example of the temperature parameters.

DESCRIPTION OF EMBODIMENTS

Hereinafter, an embodiment of the electrical source control apparatus of the present invention will be explained. Incidentally, in the following explanation, an embodiment in which the electrical source system of the present invention is applied to a vehicle (especially, a vehicle which moves (drives) by using an electrical power outputted from the electricity storage apparatus) will be explained. However, the electrical source system may be applied to any equipment other than the vehicle.

(1) Structure of Vehicle 1

Firstly, with reference to FIG. 1, the structure of the vehicle 1 of the present embodiment will be explained. FIG. 1 is a block diagram illustrating one example of the structure of the vehicle 1 of the present embodiment.

As illustrated in FIG. 1, the vehicle 1 has a motor generator 10, an axle shaft 21, wheels 22, an electrical source system 30 and an ECU (Electric Control Unit) 40 which is one example of the "electrical source control apparatus".

The motor generator 10 operates by using an electrical power outputted from the electrical source system 30 to function as a motor for supplying a power (namely, a power which is required for the vehicle 1 to move) to the axle shaft 21 by, when the vehicle 1 is in a power running state. Furthermore, the motor generator 10 functions as a generator for charging a first electrical source 31 and a second electrical source 32 in the electrical source system 30, when the vehicle 1 is in a regeneration state.

Incidentally, the vehicle 1 may have two or more motor generators 10. Furthermore, the vehicle 1 may have an engine in addition to the motor generator 10.

The electrical source system 30 outputs the electrical power, which is required for the motor generator 10 to function as the motor, to the motor generator 10, when the vehicle 1 is in the power running state. Furthermore, the electrical power which is generated by the motor generator 10 functioning as the generator is inputted from the motor generator 10 to the electrical source system 30, when the vehicle 1 is in the regeneration state.

The electrical source system 30 has the first electrical source 31 which is one example of the "first electricity storage apparatus", the second electrical source 32 which is one example of the "second electricity storage apparatus", an electrical power converter 33 and an inverter 35.

Each of the first electrical source 31 and the second electrical source 32 is an electrical source which is capable of outputting the electrical power (namely, discharging). Each of the first electrical source 31 and the second electrical source 32 may be an electrical source to which the electrical power can be inputted (namely, which can be charged), in addition to be capable of outputting the electrical power. At least one of the first electrical source 31 and the second electrical source 32 may be a lead battery, a lithium-ion battery, a nickel-hydrogen battery, a fuel battery, an electrical double layer capacitor or the like, for example.

The electrical power converter 33 converts the electrical power which is outputted from the first electrical source 31 and the electrical power which is outputted from the second electrical source 32 depending on a required electrical power which is required for the electrical source system 30 (in this case, the required electrical power is an electrical power which the electrical source system 30 should output to the motor generator 10, for example), under the control of the ECU 40. The electrical power converter 33 outputs the converted electrical power to the inverter 35. Furthermore, the electrical power converter 33 converts the electrical power which is inputted from the inverter 35 (namely, the electrical power which is generated by the regeneration of the motor generator 10) depending on the required electrical power which is required for the electrical source system 30 (in this case, the required electrical power is an electrical power which should be inputted to the electrical source system 30, and the required electrical power is substantially an electrical power which should be inputted to the first electrical source 31 and the second electrical source 32, for example), under the control of the ECU 40. The electrical power converter 33 outputs the converted electrical power to at least one of the first electrical source 31 and the second electrical source 32. The above described electrical power conversion allows the electrical power converter 33 to distribute the electrical power among the first electrical source 31, the second electrical source 32 and the inverter 35.

The inverter 35 converts the electrical power (DC (direct current) electrical power), which is outputted from the electrical power converter 33, to an AC (alternating current) electrical power, when the vehicle 1 is in the power running state. Then, the inverter 35 supplies the electrical power, which is converted to the AC electrical power, to the motor generator 10. Furthermore, the inverter 35 converts the electrical power (AC electrical power), which is generated by the motor generator 10, to the DC electrical power. Then, the inverter 35 supplies the electrical power, which is converted to the DC electrical power, to the electrical power converter 33.

The ECU 40 is an electrical controlling unit which is configured to control the operation of the electrical source system 30.

(2) Circuit Structure of Electrical Power Converter

Next, with reference to FIG. 2, the circuit structure of the electrical power converter 33 will be explained. FIG. 2 is a circuit diagram illustrating the circuit structure of the electrical power converter 33.

As illustrated in FIG. 2, the electrical power converter 33 has a switching element S1, a switching element S2, a switching element S3, a switching element S4, a diode D1, a diode D2, a diode D3, a diode D4, a reactor L1, a reactor L2, a smoothing capacitor C, a temperature sensor TS1, a temperature sensor TS2, a temperature sensor TS3 and a temperature sensor TS4.

The switching element S1 is capable of changing a switching state thereof depending on a control signal which is supplied from the ECU 40. Namely, the switching element S1 is capable of changing the switching state thereof from an ON state to an OFF state or from the OFF state to the ON state depending on the control signal which is supplied from the ECU 46. An IGBT (Insulated Gate Bipolar Transistor), a MOS (Metal Oxide Semiconductor) transistor for the electrical power or a bipolar transistor for the electrical power may be used as the switching element S1. The above explanation on the switching element S1 can be applied to the remaining switching elements S2 to S4.

The switching elements S1 to S4 are electrically connected in series between an electrical source line PL and a ground line GL. Specifically, the switching element S1 is electrically connected between the electrical source line PL and a node N1. The switching element S2 is electrically connected between the node N1 and a node N2. The switching element S3 is electrically connected between the node N2 and a node N3. The switching element S4 is electrically connected between the node N3 and the ground line GL.

The diode D1 is electrically connected in parallel to the switching element S1. The diode D2 is electrically connected in parallel to the switching element S2. The diode D3 is electrically connected in parallel to the switching element S3. The diode D4 is electrically connected in parallel to the switching element S4. Incidentally, the diode D1 is connected in an inverse-parallel manner to the switching element S1. Same argument can be applied to the remaining diodes D2 to D4.

The reactor L1 is electrically connected between a positive terminal of the first electrical source 31 and the node N2. The reactor L2 is electrically connected between a positive terminal of the second electrical source 32 and the node N1. The smoothing capacitor C is electrically connected between the electrical source line PL and the ground line GL. A negative terminal of the first electrical source 31 is electrically connected to the ground line GL. A negative terminal of the second electrical source 32 is electrically connected to the node N3. The inverter 35 is electrically connected between the electrical source line PL and the ground line GL.

The electrical power converter 33 has a chopper circuit for each of the first electrical source 31 and the second electrical source 32. As a result, the electrical power converter 33 is capable of performing the electrical power conversion with the first electrical source 31 and the second electrical source 32.

Specifically, a first chopper circuit in which each of the switching elements S1 and S2 is an upper arm and each of the switching elements S3 and S4 is a lower arm is prepared for the first electrical source 31. The first chopper circuit may function as a boost chopper circuit for the first electrical source 31, when the vehicle 1 is in the power running state. In this case, the electrical power which is outputted from the first electrical source 31 is stored in the reactor L1 during a period in which the switching elements S3 and S4 are in the ON state. The electrical power which is stored in the reactor L1 is supplied to the electrical source line PL via at least one portion of the switching elements S1 and S2 and the diodes D1 and D2 during a period in which at least one of the switching elements S3 and S4 is in the OFF state. On the other hand, the first chopper circuit may function as a step-down chopper circuit for the first electrical source 31, when the vehicle 1 is in the regeneration state. In this case, the electrical power which is generated by the regeneration is stored in the reactor L1 during a period in which the switching elements S1 and S2 are in the ON state. The electrical power which is stored in the reactor L1 is supplied to the ground line GL via at least one portion of the switching elements S3 and S4 and the diodes D3 and D4 during a period in which at least one of the switching elements S1 and S2 is in the OFF state.

On the other hand, a second chopper circuit in which each of the switching elements S4 and S1 is an upper arm and each of the switching elements S2 and S3 is a lower arm is prepared for the second electrical source 32. The second chopper circuit may function as a boost chopper circuit for the second electrical source 32, when the vehicle 1 is in the power running state. In this case, the electrical power which is outputted from the second electrical source 32 is stored in the reactor L2 during a period in which the switching elements S2 and S3 are in the ON state. The electrical power which is stored in the reactor L2 is supplied to the electrical source line PL via at least one portion of the switching elements S1 and S4 and the diodes D1 and D4 during a period in which at least one of the switching elements S2 and S3 is in the OFF state. On the other hand, the second chopper circuit may function as a step-down chopper circuit for the second electrical source 32, when the vehicle 1 is in the regeneration state. In this case, the electrical power which is generated by the regeneration is stored in the reactor L2 during a period in which the switching elements S1 and S4 are in the ON state. The electrical power which is stored in the reactor L2 is supplied to a line to which the negative terminal of the second electrical source 32 is connected via at least one portion of the switching elements S2 and S3 and the diodes D2 and D3 during a period in which at least one of the switching elements S1 and S4 is in the OFF state.

Incidentally, a fluctuation of an electrical voltage between the electrical source line PL and the ground line GL, which is caused by the change of the switching states of the switching elements S1 to S4, is suppressed by the smoothing capacitor C.

The temperature sensor TS1 is a sensor for detecting an element temperature CT1 of the switching element S1. The detection result of the temperature sensor TS1 (namely, the element temperature CT1) is monitored by the ECU 40. The temperature sensor TS2 is a sensor for detecting an element temperature CT2 of the switching element S2. The detection result of the temperature sensor TS2 (namely, the element temperature CT2) is monitored by the ECU 40. The temperature sensor TS3 is a sensor for detecting an element temperature CT3 of the switching element S3. The detection result of the temperature sensor TS3 (namely, the element temperature CT3) is monitored by the ECU 40. The temperature sensor TS4 is a sensor for detecting an element temperature CT4 of the switching element S4. The detection result of the temperature sensor TS4 (namely, the element temperature CT4) is monitored by the ECU 40. Incidentally, each of the element temperature CT1 to the element temperature CT4 is one example of the "temperature characteristic value".

(3) Operation of Electrical Power Converter 33

Next, with reference to FIG. 3 to FIG. 17, an operation of the electrical power converter 33 will be explained.

(3-1) Flow of Operation of Electrical Power Converter 33

Firstly, with reference to FIG. 3, a flow of the operation of the electrical power converter 33 will be explained. FIG. 3 is a flowchart illustrating the flow of the operation of the electrical power converter 33.

As illustrated in FIG. 3, the ECU 40 which is one example of the "obtaining device" obtains the element temperatures CT1 to CT4 by monitoring the detection result of the temperature sensors TS1 to TS4 (step S01).

Then, the ECU 40 determines whether or not an operation mode of the electrical power converter 33 is a single operation mode (a single electrical source operation mode) (step S02). Alternatively, the ECU 40 determines whether or not the operation mode of the electrical power converter 33 is changed to the single operation mode. The single operation mode is an operation mode by which the electrical power converter 33 performs the electrical power conversion with either one of the first electrical source 31 and the second electrical source 32 (in other words, the electrical power converter 33 does not perform the electrical power conversion with the other one of the first electrical source 31 and the second electrical source 32). Namely, the single operation mode is an operation mode by which an electrical current flows between the electrical power converter 33 and either one of the first electrical source 31 and the second electrical source 32 (in other words, an electrical current does not flow between the electrical power converter 33 and the other one of the first electrical source 31 and the second electrical source 32).

As a result of the determination at the step S02, when it is determined that the operation mode of the electrical power converter 33 is not the single operation mode (or is not changed to the single operation mode) (step S02: No), it is presumed that the operation mode of the electrical power converter 33 is a dual operation mode (dual electrical source operation mode/plural electrical source operation mode). Alternatively, it is presumed that the operation mode of the electrical power converter 33 is changed to the dual operation mode. The dual operation mode is an operation mode by which the electrical power converter 33 simultaneously performs the electrical power conversion with the first electrical source 31 and the electrical power conversion with the second electrical source 32. Namely, the dual operation mode is an operation mode by which the electrical current flows between the electrical power converter 33 and both of the first electrical source 31 and the second electrical source 32. In this case, the ECU 40 does not necessarily perform the below described operation after a step S03. Furthermore, the ECU 40 may control the electrical power converter 33 such that the electrical power converter 33 operates in the dual operation mode. Incidentally, the dual operation mode may be an operation mode which is illustrated in the above described Patent Literature 1. Therefore, for the purpose of simple explanation, a detailed explanation of the dual operation mode will be omitted.

On the other hand, as a result of the determination at the step S02, when it is determined that the operation mode of the electrical power converter 33 is the single operation mode (or is changed to the single operation mode) (step S02:

Yes), then, the ECU 40 determines whether or not the electrical power converter 33 performs the electrical power conversion with the first electrical source 31 (step S03).

As a result of the determination at the step S03, when it is determined that the electrical power converter 33 performs the electrical power conversion with the first electrical source 31 (step S03: Yes), then, the ECU 40 determines whether or not the vehicle 1 is in the power running state (step S04).

As a result of the determination at the step S04, when it is determined that the vehicle 1 is in the power running state (step S04: Yes), the ECU 40, which is one example of the "controlling device", controls the electrical power converter 33 such that the electrical power converter 33 operates in a first single operation mode (step S05), wherein the first single operation mode is an operation mode by which the electrical power converter 33 performs the electrical power conversion with the first electrical source 31 under the situation where the vehicle 1 is in the power running state. Moreover, the ECU 40 performs a first temperature uniform operation which is to uniform/even out the element temperatures CT1 to CT4 (in other words, decrease/reduce a difference among the element temperatures CT1 to CT4 relatively or than a predetermined amount, the same applies hereinafter) in the electrical power converter 33 which operates in the first single operation mode after, before or in parallel with the operation of the step S05 (step S10). Incidentally, the first single operation mode will be explained later in detail (see FIG. 4 and FIG. 5(*a*) to FIG. 5(*b*)). Moreover, the first temperature uniform operation will be explained later in detail (see FIG. 12).

On the other hand, as a result of the determination at the step S04, when it is determined that the vehicle 1 is not in the power running state (step S04: No), it is presumed that the vehicle 1 is in the regeneration state. In this case, the ECU 40, which is one example of the "controlling device", controls the electrical power converter 33 such that the electrical power converter 33 operates in a second single operation mode (step S06), wherein the second single operation mode is an operation mode by which the electrical power converter 33 performs the electrical power conversion with the first electrical source 31 under the situation where the vehicle 1 is in the regeneration state. Moreover, the ECU 40 performs a second temperature uniform operation which is to uniform/even out the element temperatures CT1 to CT4 in the electrical power converter 33 which operates in the second single operation mode after, before or in parallel with the operation of the step S06 (step S20). Incidentally, the second single operation mode will be explained later in detail (see FIG. 6 and FIG. 7(*a*) to FIG. 7(*b*)). Moreover, the second temperature uniform operation will be explained later in detail (see FIG. 13).

On the other hand, as a result of the determination at the step S03, when it is determined that the electrical power converter 33 does not perform the electrical power conversion with the first electrical source 31 (step S03: No), it is presumed that the electrical power converter 33 performs the electrical power conversion with the second electrical source 32. In this case, the ECU 40 determines whether or not the vehicle 1 is in the power running state (step S07).

As a result of the determination at the step S07, when it is determined that the vehicle 1 is in the power running state (step S07: Yes), the ECU 40, which is one example of the "controlling device", controls the electrical power converter 33 such that the electrical power converter 33 operates in a third single operation mode (step S08), wherein the third single operation mode is an operation mode by which the electrical power converter 33 performs the electrical power conversion with the second electrical source 32 under the situation where the vehicle 1 is in the power running state. Moreover, the ECU 40 performs a third temperature uniform operation which is to uniform/even out the element temperatures CT1 to CT4 in the electrical power converter 33 which operates in the third single operation mode after, before or in parallel with the operation of the step S08 (step S30). Incidentally, the third single operation mode will be explained later in detail (see FIG. 8 and FIG. 9(*a*) to FIG. 9(*b*)). Moreover, the third temperature uniform operation will be explained later in detail (see FIG. 14).

On the other hand, as a result of the determination at the step S07, when it is determined that the vehicle 1 is not in the power running state (step S07: No), it is presumed that the vehicle 1 is in the regeneration state. In this case, the ECU 40, which is one example of the "controlling device", controls the electrical power converter 33 such that the electrical power converter 33 operates in a fourth single operation mode (step S09), wherein the fourth single operation mode is an operation mode by which the electrical power converter 33 performs the electrical power conversion with the second electrical source 32 under the situation where the vehicle 1 is in the regeneration state. Moreover, the ECU 40 performs a fourth temperature uniform operation which is to uniform/even out the element temperatures CT1 to CT4 in the electrical power converter 33 which operates in the fourth single operation mode after, before or in parallel with the operation of the step S09 (step S40). Incidentally, the fourth single operation mode will be explained later in detail (see FIG. 10 and FIG. 11(*a*) to FIG. 11(*b*)). Moreover, the fourth temperature uniform operation will be explained later in detail (see FIG. 15).

The ECU 40 may performs the above described operation periodically or non-periodically (randomly).

(3-2) Single Operation Mode

Next, with reference to FIG. 4 to FIG. 11(*a*) and FIG. 11(*b*), the first to fourth single operation modes (the step S05, the step S06, the step S08 and the step S09 in FIG. 3) will be explained in order.

(3-2-1) First Single Operation Mode

Firstly, with reference to FIG. 4 and FIG. 5(*a*) to FIG. 5(*b*), the first single operation mode (the step S05 in FIG. 3) will be explained. FIG. 4 is a timing chart which illustrates a switching state of each of the switching elements S3 and S4 and an electrical current I (L1) which flows through the reactor L1 under a situation where the electrical power converter 33 operates in the first single operation mode. Each of FIG. 5(*a*) and FIG. 5(*b*) is a circuit diagram which illustrates an electrical current path in the electrical power converter 33 under the situation where the electrical power converter 33 operates in the first single operation mode.

The electrical power converter 33, which operates in the first single operation mode, mainly functions as the boost chopper circuit for the first electrical source 31. As described above, the switching state of each of the switching elements S3 and S4 which is the lower arm for the first electrical source 31 is changed when the electrical power converter 33 is the boost chopper circuit for the first electrical source 31. Especially in the present embodiment, the switching state of each of the switching elements S3 and S4 which is the lower arm is changed in the below described manner.

Specifically, the switching state of either one of two switching elements (namely, the switching elements S3 and S4) each of which is the lower arm is changed while the switching state of the other one of two switching elements each of which is the lower arm is kept (fixed). In other words, the switching states of two switching elements each of which is the lower arm do not change from the ON state to the OFF state (moreover, from the OFF state to the ON state) simultaneously.

It is preferable that the switching state of either one of two switching elements each of which is the lower arm be changed while the switching state of the other one of two switching elements each of which is the lower arm be kept in the ON state. For example, in the example illustrated in FIG. 4, the switching state of the switching element S3 is changed (namely, is changed from the ON state to the OFF state and then from the OFF state to the ON state) while the switching state of the switching element S4 is kept in the ON state. Namely, the switching element S4 is in the ON state during a period when the switching element S3 is in the OFF state. For example, in the example illustrated in FIG. 4, the switching state of the switching element S4 is changed while the switching state of the switching element S3 is kept in the ON state. Namely, the switching element S3 is in the ON state during a period when the switching element S4 is in the OFF state.

When the electrical power converter 33 starts to operate in the first single operation mode, the switching state of the switching element S3 may be changed while the switching state of the switching element S4 may be kept in the ON state. Namely, in an initial state, the switching element S3 is used as a switching element whose switching state should be changed. Alternatively, when the electrical power converter 33 starts to operate in the first single operation mode, the switching state of the switching element S4 may be changed while the switching state of the switching element S3 may be kept in the ON state. Namely, in an initial state, the switching element S4 is used as a switching element whose switching state should be changed. For example, when the electrical power converter 33 operates in the dual operation mode which is illustrated in the Patent Literature 1, the switching state of the switching element S3 is kept in the ON state. Therefore, there is a high possibility that a loss of the switching element S3 is smaller than a loss of the switching element S4. As a result, there is a high possibility that the element temperature CT4 is higher than the element temperature CT3. Thus, it is preferable that the switching state of the switching element S4 be kept in the ON state (namely, the switching state of the switching element S3 be changed) in order to prevent (suppress) an excessive increase of the element temperature CT4. Thus, in this situation, when the electrical power converter 33 starts to operate in the first single operation mode (for example, the operation mode of the electrical power converter 33 is changed from the dual operation mode to the first single operation mode), it is preferable that the switching state of the switching element S3 be changed while the switching state of the switching element S4 be kept in the ON state.

When both of the switching elements S3 and S4 are in the ON state, an electrical current path which is illustrated by an arrow in FIG. 5(a) is formed. As a result, the electrical power which is outputted from the first electrical source 31 is stored in the reactor L1.

On the other hand, when either one of the switching elements S3 and S4 is in the OFF state, an electrical current path which is illustrated by an arrow in FIG. 5(b) is formed. As a result, the electrical power which is stored in the reactor L1 is supplied to the electrical source line PL via at least one portion of the switching elements S1 and S2 and the diodes D1 and D2. Namely, even when either one of the switching elements S3 and S4 is in the OFF state, the electrical power which is stored in the reactor L1 is supplied to the electrical source line PL, as with the case where both of the switching elements S3 and S4 are in the OFF state. Incidentally, FIG. 5(b) illustrates an example of the electrical current path under a situation where the switching element S3 is in the OFF state and the switching element S4 is in the ON state. However, the electrical current path which is same as the electrical current path illustrated in FIG. 5(b) is formed even when the switching element S4 is in the OFF state and the switching element S3 is in the ON state.

Therefore, even when the switching state of either one of the switching elements S3 and S4 each of which is the lower arm is changed while the switching state of the other one of the switching elements S3 and S4 is kept, the electrical power converter 33 is capable of functioning as the boost chopper circuit for the first electrical source 31.

The above described explanation explains the switching state of each of the switching elements S3 and S4 which is the lower arm under the situation where the electrical power converter 33 operates in the first single operation mode. On the other hand, the switching state of each of the switching elements S1 and S2, which is the upper arm for the first electrical source 31 under the situation where the electrical power converter 33 operates in the first single operation mode, may be any state. For example, the switching state of the switching element S1 may be kept in the ON state. For example, the switching state of the switching element S1 may be kept in the OFF state. For example, the switching state of the switching element S1 may be changed in a proper timing. For example, the switching state of the switching element S2 may be kept in the ON state. For example, the switching state of the switching element S2 may be kept in the OFF state. For example, the switching state of the switching element S2 may be changed in a proper timing. However, it is preferable that at least one of the switching elements S1 and S2 be in the OFF state when both of the switching elements S3 and S4 are in the ON state, in order to prevent a short circuit between the electrical source line PL and the ground line GL. Moreover, it is preferable that both of the switching elements S1 and S2 be in the OFF state, in order to prevent the increase of the element temperatures CT1 and CT2. Moreover, it is preferable that the switching state of at least the switching element S1 which is the upper arm be kept in the OFF state, in order to prevent the electrical current from flowing from the second electrical source 32 to the electrical power converter 33 or from the electrical power converter 33 to the second electrical source 32.

(3-2-2) Second Single Operation Mode

Next, with reference to FIG. 6 and FIG. 7(a) to FIG. 7(b), the second single operation mode (the step S06 in FIG. 3) will be explained. FIG. 6 is a timing chart which illustrates a switching state of each of the switching elements S1 and S2 and an electrical current I (L1) which flows through the reactor L1 under a situation where the electrical power converter 33 operates in the second single operation mode. Each of FIG. 7(a) and FIG. 7(b) is a circuit diagram which illustrates an electrical current path in the electrical power converter 33 under the situation where the electrical power converter 33 operates in the second single operation mode.

The electrical power converter 33, which operates in the second single operation mode, mainly functions as the step-down chopper circuit for the first electrical source 31. As described above, the switching state of each of the switching elements S1 and S2 which is the upper arm for the first electrical source 31 is changed when the electrical power converter 33 is the step-down chopper circuit for the first electrical source 31. Especially in the present embodiment, the switching state of each of the switching elements S1 and S2 which is the upper arm is changed in the below described manner.

Specifically, the switching state of either one of two switching elements (namely, the switching elements S1 and S2) each of which is the upper arm is changed while the switching state of the other one of two switching elements each of which is the upper arm is kept (fixed). In other words, the switching states of two switching elements each of which is the upper arm do not change from the ON state to the OFF state (moreover, from the OFF state to the ON state) simultaneously.

It is preferable that the switching state of either one of two switching elements each of which is the upper arm be changed while the switching state of the other one of two switching elements each of which is the upper arm be kept in the ON state. For example, in the example illustrated in FIG. 6, the switching state of the switching element S1 is changed while the switching state of the switching element S2 is kept in the ON state. Namely, the switching element S2 is in the ON state during a period when the switching element S1 is in the OFF state. For example, in the example illustrated in FIG. 6, the switching state of the switching element S2 is changed while the switching state of the switching element S1 is kept in the ON state. Namely, the switching element S1 is in the ON state during a period when the switching element S2 is in the OFF state.

When the electrical power converter 33 starts to operate in the second single operation mode, the switching state of the switching element S2 may be changed while the switching state of the switching element S1 may be kept in the ON state. Alternatively, when the electrical power converter 33 starts to operate in the second single operation mode, the switching state of the switching element S1 may be changed while the switching state of the switching element S2 may be kept in the ON state.

When both of the switching elements S1 and S2 are in the ON state, an electrical current path which is illustrated by an arrow in FIG. 7(a) is formed. As a result, the electrical power which is generated by the regeneration is stored in the reactor L1.

On the other hand, when either one of the switching elements S1 and S2 is in the OFF state, an electrical current path which is illustrated by an arrow in FIG. 7(b) is formed. As a result, the electrical power which is stored in the reactor L1 is supplied to the ground line GL via at least one portion of the switching elements S3 and S4 and the diodes D3 and D4. Namely, even when either one of the switching elements S1 and S2 is in the OFF state, the electrical power which is stored in the reactor L1 is supplied to the ground line GL, as with the case where both of the switching elements S1 and S2 are in the OFF state. Incidentally, FIG. 7(b) illustrates an example of the electrical current path under a situation where the switching element S1 is in the OFF state and the switching element S2 is in the ON state. However, the electrical current path which is same as the electrical current path illustrated in FIG. 7(b) is formed even when the switching element S2 is in the OFF state and the switching element S1 is in the ON state.

Therefore, even when the switching state of either one of the switching elements S1 and S2 each of which is the upper arm is changed while the switching state of the other one of the switching elements S1 and S2 is kept, the electrical power converter 33 is capable of functioning as the step-down chopper circuit for the first electrical source 31.

The above described explanation explains the switching state of each of the switching elements S1 and S2 which is the upper arm under the situation where the electrical power converter 33 operates in the second single operation mode. On the other hand, the switching state of each of the switching elements S3 and S4, which is the lower arm for the first electrical source 31 under the situation where the electrical power converter 33 operates in the second single operation mode, may be any state, as with the case where the vehicle 1 is in the power-running state (namely, the electrical power converter 33 operates in the first single operation mode). However, it is preferable that at least one of the switching elements S3 and S4 be in the OFF state when both of the switching elements S1 and S2 are in the ON state, in order to prevent a short circuit between the electrical source line PL and the ground line GL. Moreover, it is preferable that both of the switching elements S3 and S4 be in the OFF state, in order to prevent the increase of the element temperatures CT3 and CT4. Moreover, it is preferable that the switching state of at least the switching element S4 which is the lower arm be kept in the OFF state, in order to prevent the electrical current from flowing from the second electrical source 32 to the electrical power converter 33 or from the electrical power converter 33 to the second electrical source 32.

(3-2-3) Third Single Operation Mode

Next, with reference to FIG. 8 and FIG. 9(a) to FIG. 9(b), the third single operation mode (the step S08 in FIG. 3) will be explained. FIG. 8 is a timing chart which illustrates a switching state of each of the switching elements S2 and S3 and an electrical current I (L2) which flows through the reactor L2 under a situation where the electrical power converter 33 operates in the third single operation mode. Each of FIG. 9(a) and FIG. 9(b) is a circuit diagram which illustrates an electrical current path in the electrical power converter 33 under the situation where the electrical power converter 33 operates in the third single operation mode.

The electrical power converter 33, which operates in the third single operation mode, mainly functions as the boost chopper circuit for the second electrical source 32. As described above, the switching state of each of the switching elements S2 and S3 which is the lower arm for the second electrical source 32 is changed when the electrical power converter 33 is the boost chopper circuit for the second electrical source 32. When the electrical power converter 33 operates in the third single operation mode, the switching state of either one of two switching elements each of which is the lower arm is changed while the switching state of the other one of two switching elements each of which is the lower arm is kept, as with the case where the electrical power converter 33 operates in the first single operation mode.

For example, in the example illustrated in FIG. 8, the switching state of the switching element S2 is changed while the switching state of the switching element S3 is kept in the ON state. Namely, the switching element S3 is in the ON state during a period when the switching element S2 is in the OFF state. For example, in the example illustrated in FIG. 8, the switching state of the switching element S3 is changed while the switching state of the switching element S2 is kept in the ON state. Namely, the switching element S2 is in the ON state during a period when the switching element S3 is in the OFF state.

When the electrical power converter 33 starts to operate in the third single operation mode, the switching state of the switching element S3 may be changed while the switching state of the switching element S2 may be kept in the ON state. Alternatively, when the electrical power converter 33 starts to operate in the third single operation mode, the switching state of the switching element S2 may be changed while the switching state of the switching element S3 may be kept in the ON state. For example, when a voltage of the second electrical source 32 is higher than a voltage of the first electrical source 31, there is a high possibility that the element temperature CT3 is relatively high, because a load of the switching element S3 is relatively high. Thus, it is preferable that the switching state of the switching element S3 be kept in the ON state (namely, the switching state of the switching element S2 be changed) in order to prevent an excessive increase of the element temperature CT3. Thus, in this situation, when the electrical power converter 33 starts to operate in the third single operation mode, it is preferable that the switching state of the switching element S2 be changed while the switching state of the switching element S3 be kept in the ON state.

When both of the switching elements S2 and S3 are in the ON state, an electrical current path which is illustrated by an arrow in FIG. 9(a) is formed. As a result, the electrical power which is outputted from the second electrical source 32 is stored in the reactor L2.

On the other hand, when either one of the switching elements S2 and S3 is in the OFF state, an electrical current path which is illustrated by an arrow in FIG. 9(b) is formed. As a result, the electrical power which is stored in the reactor L2 is supplied to the electrical source line PL via at least one portion of the switching elements S1 and S4 and the diodes D1 and D4. Namely, even when either one of the switching elements S2 and S3 is in the OFF state, the electrical power which is stored in the reactor L2 is supplied to the electrical source line PL, as with the case where both of the switching elements S2 and S3 are in the OFF state. Incidentally, FIG. 9(b) illustrates an example of the electrical current path under a situation where the switching element S2 is in the OFF state and the switching element S3 is in the ON state. However, the electrical current path which is same as the electrical current path illustrated in FIG. 9(b) is formed even when the switching element S3 is in the OFF state and the switching element S2 is in the ON state.

Therefore, even when the switching state of either one of the switching elements S2 and S3 each of which is the lower arm is changed while the switching state of the other one of the switching elements S2 and S3 is kept, the electrical power converter 33 is capable of functioning as the boost chopper circuit for the second electrical source 32.

The above described explanation explains the switching state of each of the switching elements S2 and S3 which is the lower arm under the situation where the electrical power converter 33 operates in the third single operation mode. On the other hand, the switching state of each of the switching elements S1 and S4 which is the upper arm for the second electrical source 32 may be any state, as with the case where the electrical power converter 33 operates in the first single operation mode. However, it is preferable that at least one of the switching elements S1 and S4 be in the OFF state when both of the switching elements S2 and S3 are in the ON state, in order to prevent the short circuit between the electrical source line PL and the ground line GL. Moreover, it is preferable that both of the switching elements S1 and S4 be in the OFF state, in order to prevent the increase of the element temperatures CT1 and CT4. Moreover, it is preferable that the switching state of at least the switching element S1 which is the upper arm be kept in the OFF state, in order to prevent the electrical current from flowing from the first electrical source 31 to the electrical power converter 33 or from the electrical power converter 33 to the first electrical source 31.

(3-2-4) Fourth Single Operation Mode

Next, with reference to FIG. 10 and FIG. 11(a) to FIG. 11(b), the fourth single operation mode (the step S09 in FIG. 3) will be explained. FIG. 10 is a timing chart which illustrates a switching state of each of the switching elements S1 and S4 and an electrical current I (L2) which flows through the reactor L2 under a situation where the electrical power converter 33 operates in the fourth single operation mode. Each of FIG. 11(a) and FIG. 11(b) is a circuit diagram which illustrates an electrical current path in the electrical power converter 33 under the situation where the electrical power converter 33 operates in the fourth single operation mode.

The electrical power converter 33, which operates in the fourth single operation mode, mainly functions as the step-down chopper circuit for the second electrical source 32. As described above, the switching state of each of the switching elements S1 and S4 which is the upper arm for the second electrical source 32 is changed when the electrical power converter 33 is the step-down chopper circuit for the second electrical source 32. When the electrical power converter 33 operates in the fourth single operation mode, the switching state of either one of two switching elements each of which is the upper arm is changed while the switching state of the other one of two switching elements each of which is the upper arm is kept, as with the case where the electrical power converter 33 operates in the second single operation mode.

For example, in the example illustrated in FIG. 10, the switching state of the switching element S1 is changed while the switching state of the switching element S4 is kept in the ON state. Namely, the switching element S4 is in the ON state during a period when the switching element S1 is in the OFF state. For example, in the example illustrated in FIG. 10, the switching state of the switching element S4 is changed while the switching state of the switching element S1 is kept in the ON state. Namely, the switching element S1 is in the ON state during a period when the switching element S4 is in the OFF state.

When the electrical power converter 33 starts to operate in the fourth single operation mode, the switching state of the switching element S4 may be changed while the switching state of the switching element S1 may be kept in the ON state. Alternatively, when the electrical power converter 33 starts to operate in the fourth single operation mode, the switching state of the switching element S1 may be changed while the switching state of the switching element S4 may be kept in the ON state.

When both of the switching elements S1 and S4 are in the ON state, an electrical current path which is illustrated by an arrow in FIG. 11(a) is formed. As a result, the electrical power which is generated by the regeneration is stored in the reactor L2.

On the other hand, when either one of the switching elements S1 and S4 is in the OFF state, an electrical current path which is illustrated by an arrow in FIG. 11(b) is formed. As a result, the electrical power which is stored in the reactor L2 is supplied to the line to which the negative terminal of the second electrical source 32 is connected via at least one portion of the switching elements S2 and S3 and the diodes D2 and D3. Namely, even when either one of the switching elements S1 and S4 is in the OFF state, the electrical power which is stored in the reactor L2 is supplied, as with the case where both of the switching elements S1 and S4 are in the OFF state. Incidentally, FIG. 11(b) illustrates an example of the electrical current path under a situation where the switching element S1 is in the OFF state and the switching element S4 is in the ON state. However, the electrical current path which is same as the electrical current path illustrated in FIG. 11(b) is formed even when the switching element S4 is in the OFF state and the switching element S1 is in the ON state.

Therefore, even when the switching state of either one of the switching elements S1 and S4 each of which is the upper arm is changed while the switching state of the other one of the switching elements S1 and S4 is kept, the electrical power converter 33 is capable of functioning as the step-down chopper circuit for the second electrical source 32.

The above described explanation explains the switching state of each of the switching elements S1 and S4 which is the upper arm under the situation where the electrical power converter 33 operates in the fourth single operation mode. On the other hand, the switching state of each of the switching elements S2 and S3 which is the lower arm for the second electrical source 32 may be any state, as with the case where the electrical power converter 33 operates in the second single operation mode. However, it is preferable that at least one of the switching elements S2 and S3 be in the OFF state when both of the switching elements S1 and S4 are in the ON state, in order to prevent the short circuit between the electrical source line PL and the ground line GL. Moreover, it is preferable that both of the switching elements S2 and S3 be in the OFF state, in order to prevent the increase of the element temperatures CT2 and CT3. Moreover, it is preferable that the switching state of at least the switching element S2 which is the lower arm be kept in the OFF state, in order to prevent the electrical current from flowing from the first electrical source 31 to the electrical power converter 33 or from the electrical power converter 33 to the first electrical source 31.

(3-3) Temperature Uniform Operation

Next, with reference to FIG. 12 to FIG. 15, the first to fourth temperature uniform operations (the step S10, the step S20, the step S30 and the step S40 in FIG. 3) will be explained.

(3-3-1) First Temperature Uniform Operation

Firstly, with reference to FIG. 12, a flow of the first temperature uniform operation will be explained. FIG. 12 is a flowchart illustrating a flow of the first temperature uniform operation.

As illustrated in FIG. 12, the ECU 40 determines whether or not the switching state of the switching element S3 is changed (step S101). In other words, the ECU 40 determines whether or not the switching state of the switching element S4 is kept in the ON state.

As a result of the determination at the step S101, when it is determined that the switching state of the switching element S3 is changed (namely, the switching state of the switching element S4 is kept in the ON state) (step S101: Yes), there is a high possibility that the element temperature CT3 is higher than the element temperature CT4. Therefore, the ECU 40 performs the below described operation from a step S111 to a step S116 to prevent the excessive increase of the element temperature CT3 and thus to reduce the difference between the element temperatures CT3 and CT4 (namely, to uniform/even out the element temperatures CT3 and CT4).

Specifically, the ECU 40 determines whether or not the element temperature CT3 is larger than a first threshold value TH1 (step S111). The first threshold value TH1 is smaller than the below described second threshold value TH2.

The second threshold value TH2 represents an element temperature at which a limitation of the electrical power which is outputted from or inputted to the electrical source system 30 (hereinafter, it is referred to as an "input/output limitation") starts. Therefore, when at least one of the element temperatures CT1 to CT4 is larger than the second threshold value TH2, the input/output limitation is performed.

The first threshold value TH1, which is smaller than the above described second threshold value TH2, is used to determine whether or not the increase of the element temperature is preferably to be prevented although the element temperature is not so high and thus the input/output limitation is not needed to performed. Therefore, the increase of the element temperature starts to be prevented at earlier timing as the first threshold value TH1 becomes smaller.

As a result of the determination at the step S111, when it is determined that the element temperature CT3 is larger than the first threshold value TH1 (step S111: Yes), the ECU 40 further determines whether or not the element temperature CT3 is larger than the second threshold value TH2 (step S112).

As a result of the determination at the step S112, when it is determined that the element temperature CT3 is not larger than the second threshold value TH2 (step S112: No), it is presumed that the increase of the element temperature CT3 is preferably to be prevented although the element temperature CT3 is not so high and thus the input/output limitation is not needed to be performed. Therefore, in this case, the ECU 40, which is one example of the "selecting device", changes a switching pattern (SW pattern) of the switching elements S3 and S4 (step S113). Specifically, the ECU 40 changes the switching element whose switching state should be changed from the switching element S3 to the switching element S4 (step S113). Namely, the ECU 40 newly selects, as the switching element whose switching state should be changed, the switching element S4 instead of the switching element S3 which is currently selected. In other words, the ECU 40 changes the switching element whose switching state should be kept in the ON state from the switching element S4 to the switching element S3 (step S113). Namely, the ECU 40 newly selects, as the switching element whose switching state should be kept in the ON state, the switching element S3 instead of the switching element S4 which is currently selected.

As a result, the switching pattern of the switching elements S3 and S4 is changed from a first switching pattern by which the switching state of the switching element S3 is changed while the switching state of the switching element S4 is kept in the ON state to a second switching pattern by which the switching state of the switching element S4 is changed while the switching state of the switching element S3 is kept in the ON state. A switching loss of the switching element S3 which is caused by the change of the switching state in the case where the switching state of the switching element S3 is kept in the ON state is smaller than that in the case where switching state of the switching element S3 is changed. Thus, an amount of a heat generation of the switching element S3 is reduced. As a result, the excessive increase of the element temperature CT3 is prevented. Therefore, the difference between the element temperatures CT3 and CT4 (moreover, the difference between the element temperature CT3 and the element temperatures CT1 and CT2) becomes smaller than that before the switching pattern is changed. As a result, the element temperatures CT3 and CT4 (moreover, the element temperature CT3 and the element temperatures CT1 and CT2) are uniformed more than those before the switching pattern is changed.

On the other hand, as a result of the determination at the step S112, when it is determined that the element temperature CT3 is larger than the second threshold value TH2 (step S112: Yes), it is presumed that the element temperature CT3 is so high and thus the input/output limitation should be performed. Therefore, in this case, the ECU 40, which is one example of the "selecting device", changes the switching pattern of the switching elements S3 and S4 in a same manner at the step S113 (step S114). Moreover, in this case, the ECU 40, which is one example of the "limiting device", performs the input/output limitation (step S114).

On the other hand, as a result of the determination at the step S111, when it is determined that the element temperature CT3 is not larger than the first threshold value TH1 (step S111: No), it is presumed that there is less need to prevent the excessive increase of the element temperature CT3 by changing the switching pattern of the switching elements S3 and S4. On the other hand, the element temperature CT4 may be higher than the element temperature CT3 for any cause, although there is a high possibility that the element temperature CT4 is smaller than the element temperature CT3 when the switching state of the switching element S3 is changed. When the element temperature CT4 is higher than the element temperature CT3, the ECU 40 is capable of performing the input/output limitation, although the ECU 40 is difficult to prevent the excessive increase of the element temperature CT4 by changing the switching pattern because the switching state of the switching element S4 is already kept in the ON state. Thus, the ECU 40 determines whether or not the element temperature CT4 is larger than the second threshold value TH2 (step S115).

As a result of the determination at the step S115, when it is determined that the element temperature CT4 is larger than the second threshold value TH2 (step S115: Yes), it is presumed that the element temperature CT4 is so high and thus the input/output limitation should be performed. Therefore, in this case, the ECU 40, which is one example of the "limiting device", performs the input/output limitation (step S116). On the other hand, as a result of the determination at the step S115, when it is determined that the element temperature CT4 is not larger than the second threshold value TH2 (step S115: No), the ECU 40 does not necessarily perform the input/output limitation.

On the other hand, as a result of the determination at the step S101, when it is determined that the switching state of the switching element S3 is not changed (namely, the switching state of the switching element S4 is not kept in the ON state) (step S101: No), it is presumed that the switching state of the switching element S4 is changed (namely, the switching state of the switching element S3 is kept in the ON state). In this case, there is a high possibility that the element temperature CT4 is higher than the element temperature CT3. Therefore, the ECU 40 performs the below described operation from a step S121 to a step S126 to prevent the excessive increase of the element temperature CT4 and thus to reduce the difference between the element temperatures CT4 and CT3 (namely, to uniform/even out the element temperatures CT4 and CT3). Incidentally, the operation from the step S121 to the step S126 is different from the above described operation from the step S111 to the step S116 in that (i) the "switching element S3" in the latter operation is replaced by the "switching element S4" in the former operation, (ii) the "switching element S4" in the latter operation is replaced by the "switching element S3" in the former operation, (iii) the "element temperature CT3" in the latter operation is replaced by the "element temperature CT4" in the former operation and (iv) the "element temperature CT4" in the latter operation is replaced by the "element temperature CT3" in the former operation. Another feature of the operation from the step S121 to the step S126 may be same as that of the operation from the step S111 to the step S116.

Specifically, when the element temperature CT4 is larger than the first threshold value TH1 and the element temperature CT4 is not larger than the second threshold value TH2 (step S121: Yes and step S122: No), the ECU 40 changes the switching pattern of the switching elements S3 and S4 (step S123). Specifically, the ECU 40 changes the switching element whose switching state should be changed from the switching element S4 to the switching element S3 (step S123). As a result, the excessive increase of the element temperature CT4 is prevented. Therefore, the difference between the element temperatures CT4 and CT3 (moreover, the difference between the element temperature CT4 and the element temperatures CT1 and CT2) becomes smaller than that before the switching pattern is changed. As a result, the element temperatures CT4 and CT3 (moreover, the element temperature CT4 and the element temperatures CT1 and CT2) are uniformed more than those before the switching pattern is changed.

When the element temperature CT4 is larger than the first threshold value TH1 and the element temperature CT4 is larger than the second threshold value TH2 (step S121: Yes and step S122: Yes), the ECU 40 changes the switching pattern of the switching elements S3 and S4 in a same manner at the step S123 and performs the input/output limitation (step S124).

When the element temperature CT4 is not larger than the first threshold value TH1 and the element temperature CT3 is larger than the second threshold value TH2 (step S121: No and step S125: Yes), the ECU 40 performs the input/output limitation (step S126).

When the element temperature CT4 is not larger than the first threshold value TH1 and the element temperature CT3 is not larger than the second threshold value TH2 (step S121: No and step S125: No), the ECU 40 does not necessarily change the switching pattern of the switching elements S3 and S4 and does not necessarily perform the input/output limitation.

Incidentally, the ECU 40 performs the first temperature uniform operation to change the switching pattern of the switching elements S3 and S4 each of which is the lower arm for the first electrical source 31. However, the ECU 40 may change the switching pattern of the switching elements S1 and S2 each of which is the upper arm for the first electrical source 31 in a same manner to change the switching pattern of the switching elements S3 and S4. For example, when the switching state of at least one of the switching elements S1 and S2 each of which is the upper arm for the first electrical source 31 is changed or kept in the ON state, it is preferable that the switching pattern of the switching elements S1 and S2 each of which is the upper arm for the first electrical source 31 be changed. However, when the switching state of each of the switching elements S1 and S2 which is the upper arm for the first electrical source 31 is kept in the OFF state, the ECU 40 does not necessarily change the switching pattern of the switching elements S1 and S2 each of which is the upper arm for the first electrical source 31, because there is less possibility that the element temperatures CT1 and CT2 increase excessively.

(3-3-2) Second Temperature Uniform Operation

Next, with reference to FIG. 13, a flow of the second temperature uniform operation will be explained. FIG. 13 is a flowchart illustrating a flow of the second temperature uniform operation.

As illustrated in FIG. 13, in the second temperature uniform operation, the ECU 40 performs the operation from a step S201 to a step S226. Incidentally, the operation from the step S201 to the step S226 is different from the above described operation from the step S101 to the step S126 in that (i) the "switching element S3" in the latter operation is replaced by the "switching element S1" in the former operation, (ii) the "switching element S4" in the latter operation is replaced by the "switching element S2" in the former operation, (iii) the "element temperature CT3" in the latter operation is replaced by the "element temperature CT1" in the former operation and (iv) the "element temperature CT4" in the latter operation is replaced by the "element temperature CT2" in the former operation. Another feature of the operation from the step S201 to the step S226 may be same as that of the operation from the step S101 to the step S126.

Specifically, when the switching state of the switching element S1 is changed, the element temperature CT1 is larger than the first threshold value TH1 and the element temperature CT1 is not larger than the second threshold value TH2 (step S201: Yes, step S211: Yes and step S212: No), the ECU 40 changes the switching pattern of the switching elements S1 and S1 (step S213). Specifically, the ECU 40 changes the switching element whose switching state should be changed from the switching element S1 to the switching element S2 (step S213). As a result, the excessive increase of the element temperature CT1 is prevented. Therefore, the difference between the element temperatures CT1 and CT2 (moreover, the difference between the element temperature CT1 and the element temperatures CT3 and CT4) becomes smaller than that before the switching pattern is changed. As a result, the element temperatures CT1 and CT2 (moreover, the element temperature CT1 and the element temperatures CT3 and CT4) are uniformed more than those before the switching pattern is changed.

When the switching state of the switching element S1 is changed, the element temperature CT1 is larger than the first threshold value TH1 and the element temperature CT1 is larger than the second threshold value TH2 (step S201: Yes, step S211: Yes and step S212: Yes), the ECU 40 changes the switching pattern of the switching elements S1 and S2 in a same manner at the step S213 and performs the input/output limitation (step S214).

When the switching state of the switching element S1 is changed, the element temperature CT1 is not larger than the first threshold value TH1 and the element temperature CT2 is larger than the second threshold value TH2 (step S201: Yes, step S211: No and step S215: Yes), the ECU 40 performs the input/output limitation (step S216).

When the switching state of the switching element S1 is changed, the element temperature CT1 is not larger than the first threshold value TH1 and the element temperature CT2 is not larger than the second threshold value TH2 (step S201: Yes, step S211: No and step S215: No), the ECU 40 does not necessarily change the switching pattern and does not necessarily perform the input/output limitation.

When the switching state of the switching element S1 is not changed, the element temperature CT2 is larger than the first threshold value TH1 and the element temperature CT2 is not larger than the second threshold value TH2 (step S201: No, step S221: Yes and step S222: No), the ECU 40 changes the switching pattern of the switching elements S1 and S1 (step S223). Specifically, the ECU 40 changes the switching element whose switching state should be changed from the switching element S2 to the switching element S1 (step S223). As a result, the excessive increase of the element temperature CT2 is prevented. Therefore, the difference between the element temperatures CT2 and CT1 (moreover, the difference between the element temperature CT2 and the element temperatures CT3 and CT4) becomes smaller than that before the switching pattern is changed. As a result, the element temperatures CT2 and CT1 (moreover, the element temperature CT2 and the element temperatures CT3 and CT4) are uniformed more than those before the switching pattern is changed.

When the switching state of the switching element S1 is not changed, the element temperature CT2 is larger than the first threshold value TH1 and the element temperature CT2 is larger than the second threshold value TH2 (step S201: No, step S221: Yes and step S222: Yes), the ECU 40 changes the switching pattern of the switching elements S1 and S2 in a same manner at the step S223 and performs the input/output limitation (step S224).

When the switching state of the switching element S1 is not changed, the element temperature CT2 is not larger than the first threshold value TH1 and the element temperature CT1 is larger than the second threshold value TH2 (step S201: No, step S221: No and step S225: Yes), the ECU 40 performs the input/output limitation (step S226).

When the switching state of the switching element S1 is not changed, the element temperature CT2 is not larger than the first threshold value TH1 and the element temperature CT1 is not larger than the second threshold value TH2 (step S201: No, step S221: No and step S225: No), the ECU 40 does not necessarily change the switching pattern and does not necessarily perform the input/output limitation.

Incidentally, in the second temperature uniform operation, the ECU 40 may change the switching pattern of the switching elements S3 and S4 each of which is the lower arm for the first electrical source 31 as with the first temperature uniform operation. Namely, the ECU 40 may change the switching pattern of the switching elements S3 and S4 each of which is the lower arm for the first electrical source 31 in a same manner to change the switching pattern of the switching elements S1 and S2.

(3-3-3) Third Temperature Uniform Operation

Next, with reference to FIG. 14, a flow of the third temperature uniform operation will be explained. FIG. 14 is a flowchart illustrating a flow of the third temperature uniform operation.

As illustrated in FIG. 14, in the third temperature uniform operation, the ECU 40 performs the operation from a step S301 to a step S326. Incidentally, the operation from the step S301 to the step S326 is different from the above described operation from the step S101 to the step S126 in that (i) the "switching element S3" in the latter operation is replaced by the "switching element S2" in the former operation, (ii) the "switching element S4" in the latter operation is replaced by the "switching element S3" in the former operation, (iii) the "element temperature CT3" in the latter operation is replaced by the "element temperature CT2" in the former operation and (iv) the "element temperature CT4" in the latter operation is replaced by the "element temperature CT3" in the former operation. Another feature of the operation from the step S301 to the step S326 may be same as that of the operation from the step S101 to the step S126.

Specifically, when the switching state of the switching element S2 is changed, the element temperature CT2 is larger than the first threshold value TH1 and the element temperature CT2 is not larger than the second threshold value TH2 (step S301: Yes, step S311: Yes and step S312: No), the ECU 40 changes the switching pattern of the switching elements S2 and S3 (step S313). Specifically, the ECU 40 changes the switching element whose switching state should be changed from the switching element S2 to the switching element S3 (step S313). As a result, the excessive increase of the element temperature CT2 is prevented. Therefore, the difference between the element temperatures CT2 and CT3 (moreover, the difference between the element temperature CT2 and the element temperatures CT1 and CT4) becomes smaller than that before the switching pattern is changed. As a result, the element temperatures CT2 and CT3 (moreover, the element temperature CT2 and the element temperatures CT1 and CT4) are uniformed more than those before the switching pattern is changed.

When the switching state of the switching element S2 is changed, the element temperature CT2 is larger than the first threshold value TH1 and the element temperature CT2 is larger than the second threshold value TH2 (step S301: Yes, step S311: Yes and step S312: Yes), the ECU 40 changes the switching pattern of the switching elements S2 and S3 in a same manner at the step S313 and performs the input/output limitation (step S314).

When the switching state of the switching element S2 is changed, the element temperature CT2 is not larger than the first threshold value TH1 and the element temperature CT3 is larger than the second threshold value TH2 (step S301: Yes, step S311: No and step S315: Yes), the ECU 40 performs the input/output limitation (step S316).

When the switching state of the switching element S2 is changed, the element temperature CT2 is not larger than the first threshold value TH1 and the element temperature CT3 is not larger than the second threshold value TH2 (step S301: Yes, step S311: No and step S315: No), the ECU 40 does not necessarily change the switching pattern and does not necessarily perform the input/output limitation.

When the switching state of the switching element S2 is not changed, the element temperature CT3 is larger than the first threshold value TH1 and the element temperature CT3 is not larger than the second threshold value TH2 (step S301: No, step S321: Yes and step S322: No), the ECU 40 changes the switching pattern of the switching elements S2 and S3 (step S323). Specifically, the ECU 40 changes the switching element whose switching state should be changed from the switching element S3 to the switching element S2 (step S323). As a result, the excessive increase of the element temperature CT3 is prevented. Therefore, the difference between the element temperatures CT3 and CT2 (moreover, the difference between the element temperature CT3 and the element temperatures CT1 and CT4) becomes smaller than that before the switching pattern is changed. As a result, the element temperatures CT3 and CT2 (moreover, the element temperature CT3 and the element temperatures CT1 and CT4) are uniformed more than those before the switching pattern is changed.

When the switching state of the switching element S2 is not changed, the element temperature CT3 is larger than the first threshold value TH1 and the element temperature CT3 is larger than the second threshold value TH2 (step S301: No, step S321: Yes and step S322: Yes), the ECU 40 changes the switching pattern of the switching elements S2 and S3 in a same manner at the step S323 and performs the input/output limitation (step S324).

When the switching state of the switching element S2 is not changed, the element temperature CT3 is not larger than the first threshold value TH1 and the element temperature CT2 is larger than the second threshold value TH2 (step S301: No, step S321: No and step S325: Yes), the ECU 40 performs the input/output limitation (step S326).

When the switching state of the switching element S2 is not changed, the element temperature CT3 is not larger than the first threshold value TH1 and the element temperature CT2 is not larger than the second threshold value TH2 (step S301: No, step S321: No and step S325: No), the ECU 40 does not necessarily change the switching pattern and does not necessarily perform the input/output limitation.

Incidentally, in the third temperature uniform operation, the ECU 40 may change the switching pattern of the switching elements S1 and S4 each of which is the upper arm for the second electrical source 32 as with the first temperature uniform operation. Namely, the ECU 40 may change the switching pattern of the switching elements S1 and S4 each of which is the upper arm for the second electrical source 32 in a same manner to change the switching pattern of the switching elements S2 and S3.

(3-3-4) Fourth Temperature Uniform Operation

Next, with reference to FIG. 15, a flow of the fourth temperature uniform operation will be explained. FIG. 15 is a flowchart illustrating a flow of the fourth temperature uniform operation.

As illustrated in FIG. 15, in the third temperature uniform operation, the ECU 40 performs the operation from a step S401 to a step S426. Incidentally, the operation from the step S401 to the step S426 is different from the above described operation from the step S111 to the step S116 in that (i) the "switching element S3" in the latter operation is replaced by the "switching element S1" in the former operation and (ii) the "element temperature CT3" in the latter operation is replaced by the "element temperature CT1" in the former operation. Another feature of the operation from the step S401 to the step S426 may be same as that of the operation from the step S101 to the step S126.

Specifically, when the switching state of the switching element S1 is changed, the element temperature CT1 is larger than the first threshold value TH1 and the element temperature CT1 is not larger than the second threshold value TH2 (step S401: Yes, step S411: Yes and step S412: No), the ECU 40 changes the switching pattern of the switching elements S1 and S4 (step S413). Specifically, the ECU 40 changes the switching element whose switching state should be changed from the switching element S1 to the switching element S4 (step S413). As a result, the excessive increase of the element temperature CT1 is prevented. Therefore, the difference between the element temperatures CT1 and CT4 (moreover, the difference between the element temperature CT1 and the element temperatures CT2 and CT3) becomes smaller than that before the switching pattern is changed. As a result, the element temperatures CT1 and CT4 (moreover, the element temperature CT1 and the element temperatures CT2 and CT3) are uniformed more than those before the switching pattern is changed.

When the switching state of the switching element S1 is changed, the element temperature CT1 is larger than the first threshold value TH1 and the element temperature CT1 is larger than the second threshold value TH2 (step S401: Yes, step S411: Yes and step S412: Yes), the ECU 40 changes the switching pattern of the switching elements S1 and S4 in a same manner at the step S413 and performs the input/output limitation (step S414).

When the switching state of the switching element S1 is changed, the element temperature CT1 is not larger than the first threshold value TH1 and the element temperature CT4 is larger than the second threshold value TH2 (step S401: Yes, step S411: No and step S415: Yes), the ECU 40 performs the input/output limitation (step S416).

When the switching state of the switching element S1 is changed, the element temperature CT1 is not larger than the first threshold value TH1 and the element temperature CT4 is not larger than the second threshold value TH2 (step S401: Yes, step S411: No and step S415: No), the ECU 40 does not necessarily change the switching pattern and does not necessarily perform the input/output limitation.

When the switching state of the switching element S1 is not changed, the element temperature CT4 is larger than the first threshold value TH1 and the element temperature CT4 is not larger than the second threshold value TH2 (step S401: No, step S421: Yes and step S422: No), the ECU 40 changes the switching pattern of the switching elements S1 and S4 (step S423). Specifically, the ECU 40 changes the switching element whose switching state should be changed from the switching element S4 to the switching element S1 (step S423). As a result, the excessive increase of the element temperature CT4 is prevented. Therefore, the difference between the element temperatures CT4 and CT1 (moreover, the difference between the element temperature CT4 and the element temperatures CT2 and CT3) becomes smaller than that before the switching pattern is changed. As a result, the element temperatures CT4 and CT1 (moreover, the element temperature CT4 and the element temperatures CT2 and CT3) are uniformed more than those before the switching pattern is changed.

When the switching state of the switching element S1 is not changed, the element temperature CT4 is larger than the first threshold value TH1 and the element temperature CT4 is larger than the second threshold value TH2 (step S401: No, step S421: Yes and step S422: Yes), the ECU 40 changes the switching pattern of the switching elements S1 and S4 in a same manner at the step S423 and performs the input/output limitation (step S424).

When the switching state of the switching element S1 is not changed, the element temperature CT4 is not larger than the first threshold value TH1 and the element temperature CT1 is larger than the second threshold value TH2 (step S401: No, step S421: No and step S425: Yes), the ECU 40 performs the input/output limitation (step S426).

When the switching state of the switching element S1 is not changed, the element temperature CT4 is not larger than the first threshold value TH1 and the element temperature CT1 is not larger than the second threshold value TH2 (step S401: No, step S421: No and step S425: No), the ECU 40 does not necessarily change the switching pattern and does not necessarily perform the input/output limitation. Incidentally, in the fourth temperature uniform operation, the ECU 40 may change the switching pattern of the switching elements S2 and S3 each of which is the lower arm for the second electrical source 32 as with the second temperature uniform operation. Namely, the ECU 40 may change the switching pattern of the switching elements S2 and S3 each of which is the lower arm for the second electrical source 32 in a same manner to change the switching pattern of the switching elements S1 and S4.

(3-4) Technical Effect

Next, with reference to FIG. 16(a) to FIG. 16(b) and FIG. 17(a) to FIG. 17(b), a technical effect of the single operation mode and the temperature uniform operation which are performed under the control of the ECU 40 will be explained. Each of FIG. 16(a) and FIG. 16(b) is a timing chart which illustrates the switching states of the switching elements Si to S4 when the electrical power converter 33 operates in the above described first, second, third or fourth single operation mode and the switching states of the switching elements S1 to S4 when the electrical power converter 33 operates in a first comparative operation mode by which the switching states of two switching elements each of which is the upper arm or the lower arm are changed simultaneously. FIG. 17(a) is a timing chart which illustrates the switching states of the switching elements S3 and S4 and the element temperatures CT3 and CT4 when the electrical power converter 33 operates in a second comparative operation mode by which the switching pattern is not changed regardless of the element temperatures CT3 and CT4. FIG. 17(b) is a timing chart which illustrates the switching states of the switching elements S3 and S4 and the element temperatures CT3 and CT4 when the first temperature uniform operation is performed.

As illustrated in FIG. 16(a), in the first comparative operation mode, the switching states of two switching elements each of which is the lower arm are changed simultaneously, when the vehicle 1 is in the power running state. For example, in the first comparative operation mode, the switching states of the switching elements S3 and S4 each of which is the lower arm are changed simultaneously, when the electrical power converter 33 operates in the single operation mode to perform the electrical power conversion with the first electrical source 31 under the situation where the vehicle 1 is in the power running state. For example, in the first comparative operation mode, the switching states of the switching elements S2 and S3 each of which is the lower arm are changed simultaneously, when the electrical power converter 33 operates in the single operation mode to perform the electrical power conversion with the second electrical source 32 under the situation where the vehicle 1 is in the power running state.

On the other hand, in the present embodiment, the switching state of either one of two switching elements each of which is the lower arm is changed while the switching state of the other one of two switching elements each of which is the lower arm is kept, when the vehicle 1 is in the power running state. Thus, the number of the switching of each of two switching elements which is the lower arm is reduced (reduced by half) compared to the number of the switching of each switching element in the first comparative operation mode. Therefore, a switching loss in the electrical power converter 33 is also reduced due to the reduction of the number of the switching.

As illustrated in FIG. 16(b), in the first comparative operation mode, the switching states of two switching elements each of which is the upper arm are changed simultaneously, when the vehicle 1 is in the regeneration state. For example, in the first comparative operation mode, the switching states of the switching elements S1 and S2 each of which is the upper arm are changed simultaneously, when the electrical power converter 33 operates in the single operation mode to perform the electrical power conversion with the first electrical source 31 under the situation where the vehicle 1 is in the regeneration state. For example, in the first comparative operation mode, the switching states of the switching elements S1 and S4 each of which is the upper arm are changed simultaneously, when the electrical power converter 33 operates in the single operation mode to perform the electrical power conversion with the second electrical source 32 under the situation where the vehicle 1 is in the regeneration state.

On the other hand, in the present embodiment, the switching state of either one of two switching elements each of which is the upper arm is changed while the switching state of the other one of two switching elements each of which is the upper arm is kept, when the vehicle 1 is in the regeneration state. Thus, the number of the switching of each of two switching elements which is the upper arm is reduced (reduced by half) compared to the number of the switching of each switching element in the first comparative operation mode. Therefore, the switching loss in the electrical power converter 33 is also reduced due to the reduction of the number of the switching.

Especially in the present embodiment, the reduction of the number of the switching results in the reduction of the switching loss. Namely, the switching loss is reduced without using cancellation of an electrical current which flows through the first electrical source 31 and an electrical current which flows through the second electrical source 32 on at least one of the switching elements S1 to S4. On the other hand, the invention disclosed in the Patent Literature 1 reduces the switching loss by using the cancellation of the electrical current which flows through the first electrical source 31 and the electrical current which flows through the second electrical source 32 on at least one of the switching elements S1 to S4. Thus, there is a possibility that the switching loss is not reduced by the invention disclosed in the Patent Literature 1 when the electrical power converter 33 operates in the single operation mode. However, in the present embodiment, the switching loss is effectively reduced even when the electrical power converter 33 operates in the single operation mode.

Next, as illustrated in FIG. 17(a), in the second comparative operation mode, the switching pattern is not changed regardless of the element temperatures CT1 to CT4. For example, in the second comparative operation mode, the switching state of the switching element S3 continues to be changed while the switching state of the switching element S4 is kept in the ON state, when the electrical power converter 33 operates in the single operation mode to perform the electrical power conversion with the first electrical source 31 under the situation where the vehicle 1 is in the power running state. Thus, the element temperature CT3 increases more than the element temperature CT4 does in the second comparative operation mode. Namely, the element temperature of only one of two switching elements each of which is the lower arm is likely to increase excessively. As a result, the input/output limitation is performed on the electrical source system 30 more frequently in the second comparative operation mode, because the element temperature CT3 is likely to be larger than the second threshold value TH2. Incidentally, as illustrated in FIG. 17(a), the excessive increase of the element temperature of only one of two switching elements each of which is the lower arm leads to an increase of the difference between the element temperatures of two switching elements each of which is the lower arm.

On the other hand, as illustrated in FIG. 17(b), in the present embodiment, the switching pattern is changed on the basis of the element temperatures CT1 to CT4. For example, when the element temperature CT3 is larger than the first threshold value TH1 under the situation where the electrical power converter 33 operates in the first single operation mode and the switching state of the switching element S3 is changed, the switching state of the switching element S3 is kept in the ON state. For example, when the element temperature CT4 is larger than the first threshold value TH1 under the situation where the electrical power converter 33 operates in the first single operation mode and the switching state of the switching element S4 is changed, the switching state of the switching element S4 is kept in the ON state. As a result, in the present embodiment, the excessive increase of only the element temperature CT3 and the excessive increase of only the element temperature CT4 are appropriately prevented. Namely, the excessive increase of only one of two switching elements each of which is the lower arm is appropriately prevented. As a result, the input/output limitation is performed on the electrical source system 30 less frequently in the present embodiment, because both of the element temperatures CT3 and CT4 are difficult to be larger than the second threshold value TH2.

As illustrated in FIG. 17(b), when the excessive increase of the element temperature of only one of two switching elements each of which is the lower arm is prevented, the increase of the difference between the element temperatures of two switching elements each of which is the lower arm is also prevented. Namely, FIG. 17(b) illustrates that the element temperatures CT3 and CT4 are uniformed. Therefore, the operation which changes the switching pattern when the element temperature of at least one of two switching elements each of which is the lower arm is larger than the first threshold value TH1 corresponds to the operation which changes the switching pattern to decrease the difference between the element temperatures of two switching elements each of which is the lower arm (for example, decrease the difference than a predetermined amount or the previous difference before the change of the switching pattern).

FIG. 17(a) and FIG. 17(b) illustrate an example in which the electrical power converter 33 operates in the first single operation, for the purpose of the simple explanation. Same technical effect can be realized even when the electrical power converter 33 operates in any one of the second to fourth single operation mode.

(4) Modified Example of Temperature Uniform Operation

Next, with reference to FIG. 18, a modified example of the temperature uniform operation will be explained. In the below explanation, a modified example of the first temperature uniform operation will be explained. FIG. 18 is a flowchart illustrating a flow of the modified example of the first temperature uniform operation. An explanation relating to an operation which is same as the operation in the first temperature uniform operation will be omitted by using the same step number.

The above described first temperature uniform operation is performed on the basis of the determination result of whether or not the element temperature CT3 or CT4 is larger than the first threshold value TH1. The modified example of the first temperature uniform operation is performed on the basis of the determination result of whether or not an absolute value of the difference between the element temperatures CT3 and CT4 is larger than a third threshold value TH3, in addition to or instead of the determination result of whether or not the element temperature CT3 or CT4 is larger than the first threshold value TH1. In the below explanation, the modified example which is performed on the basis of the determination result of whether or not the absolute value of the difference between the element temperatures CT3 and CT4 is larger than the third threshold value TH3, instead of the determination result of whether or not the element temperature CT3 or CT4 is larger than the first threshold value TH1, will be explained.

As illustrated in FIG. 18, even in the modified example, the ECU 40 determines whether or not the switching state of the switching element S3 is changed (step S101).

As a result of the determination at the step S101, when it is determined that the switching state of the switching element S3 is changed (step S101: Yes), the ECU 40 determines whether or not the absolute value of the difference between the element temperatures CT3 and CT4 is larger than the third threshold value TH3 (step S131). The third threshold value TH3 is smaller than the second threshold value TH2. It is preferable that the third threshold value TH3 be smaller than the first threshold value TH1. The third threshold value TH3 may be set in terms of that the element temperature CT3 or CT4 is likely to be larger than the first threshold value TH1 when the absolute value of the difference between the element temperatures CT3 and CT4 is larger than the third threshold value TH3.

As a result of the determination at the step S131, when it is determined that the absolute value of the difference between the element temperatures CT3 and CT4 is larger than the third threshold value TH3 (step S131: Yes), it is presumed that there is a high possibility that the element temperature CT3 or CT4 increases excessively. In this case, the ECU 40 determines whether or not the element temperature CT3 is larger than the element temperature CT4 in order to determine which one of the element temperatures CT3 and CT4 increases excessively (step S132).

As a result of the determination at the step S132, when it is determined that the element temperature CT3 is larger than the element temperature CT4 (step S132: Yes), it is presumed that there is high possibility that the element temperature CT3 increases excessively. In this case, the ECU 40 further determines whether or not the element temperature CT3 is larger than the second threshold value TH2 (step S133).

As a result of the determination at the step S133, when it is determined that the element temperature CT3 is not larger than the second threshold value TH2 (step S133: No), it is presumed that the increase of the element temperature CT3 is preferably to be prevented although the element temperature CT3 is not so high and thus the input/output limitation is not needed to be performed. Therefore, in this case, the ECU 40 changes the switching pattern of the switching elements S3 and S4 (step S113). As a result, the excessive increase of the element temperature CT3 is prevented. Therefore, the difference between the element temperatures CT3 and CT4 (moreover, the difference between the element temperature CT3 and the element temperatures CT1 and CT2) becomes smaller than that before the switching pattern is changed. As a result, the element temperatures CT3 and CT4 (moreover, the element temperature CT3 and the element temperatures CT1 and CT2) are uniformed more than those before the switching pattern is changed.

On the other hand, as a result of the determination at the step S133, when it is determined that the element temperature CT3 is larger than the second threshold value TH2 (step S133: Yes), it is presumed that the element temperature CT3 is so high and thus the input/output limitation should be performed. Therefore, in this case, the ECU 40changes the switching pattern of the switching elements S3 and S4 in a same manner at the step S113 and performs the input/output limitation (step S114).

As a result of the determination at the step S132, when it is determined that the element temperature CT3 is not larger than the element temperature CT4 (step S132: No), it is presumed that there is high possibility that the element temperature CT4 increases excessively. However, the ECU 40 is difficult to prevent the excessive increase of the element temperature CT4 by changing the switching pattern, because the switching state of the switching element S4 is already kept in the ON state. On the other hand, the ECU 40 is capable of performing the input/output limitation. Thus, the ECU 40 determines whether or not the element temperature CT4 is larger than the second threshold value TH2 (step S135).

As a result of the determination at the step S135, when it is determined that the element temperature CT4 is larger than the second threshold value TH2 (step S135: Yes), it is presumed that the element temperature CT4 is so high and thus the input/output limitation should be performed. Therefore, in this case, the ECU 40 performs the input/output limitation (step S116). On the other hand, as a result of the determination at the step S135, when it is determined that the element temperature CT4 is not larger than the second threshold value TH2 (step S135: No), the ECU 40 does not necessarily perform the input/output limitation.

On the other hand, as a result of the determination at the step S131, when it is determined that the absolute value of the difference between the element temperatures CT3 and CT4 is not larger than the third threshold value TH3 (step S131: No), it is presumed that there is a less possibility that only one of the element temperatures CT3 and CT4 increases excessively. However, even when it is determined that the absolute value of the difference between the element temperatures CT3 and CT4 is not larger than the third threshold value TH3, there may be a possibility that both of the element temperatures CT3 and CT4 increases excessively. Thus, the ECU 40 determines whether or not at least one of the element temperatures CT3 and CT4 is larger than the second threshold value TH2 (step S134 and step S135).

As a result of the determination at the step S134 and the step S135, when it is determined that at least one of the element temperatures CT3 and CT4 is larger than the second threshold value TH2 (step S134: Yes or step S135: Yes), the ECU 40 performs the input/output limitation (step S116). On the other hand, as a result of the determination at the step S134 and the step S135, when it is determined that both of the element temperatures CT3 and CT4 are not larger than the second threshold value TH2 (step S134: No and step S135: No), the ECU 40 does not necessarily perform the input/output limitation.

On the other hand, as a result of the determination at the step S101, when it is determined that the switching state of the switching element S3 is not changed (step S101: No), the ECU 40 performs the operation from a step S141 to a step S145 and from the step S123 to the step S126 illustrated in FIG. 18. The operation from the step S141 to the step S145 and from the step S123 to the step S126 is different from the above described operation from the step S131 to the step S135 and from the step S113 to the step S116 in that (i) the "switching element S3" in the latter operation is replaced by the "switching element S4" in the former operation, (ii) the "switching element S4" in the latter operation is replaced by the "switching element S3" in the former operation, (iii) the "element temperature CT3" in the latter operation is replaced by the "element temperature CT4" in the former operation and (iv) the "element temperature CT4" in the latter operation is replaced by the "element temperature CT3" in the former operation. Another feature of the operation from the step S141 to the step S145 and from the step S123 to the step S126 may be same as that of the operation from the step S131 to the step S135 and from the step S113 to the step S116. Therefore, the explanation of the operation from the step S141 to the step S145 and from the step S123 to the step S126 is omitted for the purpose of the simple explanation.

Even the modified example of the first temperature uniform operation is capable of enjoying the technical effect which the above described first temperature uniform operation is capable of enjoying.

FIG. 18 illustrates the modified example of the first temperature uniform operation. However, the second temperature uniform operation may be performed on the basis of the determination result of whether or not an absolute value of the difference between the element temperatures CT1 and CT2 is larger than a third threshold value TH3, as with the modified example of the first temperature uniform operation. The modified example of the second temperature uniform operation is different from the modified example of the first temperature uniform operation which is illustrated in FIG. 18 in that (i) the "switching element S3" in the latter operation is replaced by the "switching element S1" in the former operation, (ii) the "switching element S4" in the latter operation is replaced by the "switching element S2" in the former operation, (iii) the "element temperature CT3" in the latter operation is replaced by the "element temperature CT1" in the former operation and (iv) the "element temperature CT4" in the latter operation is replaced by the "element temperature CT2" in the former operation. Another feature of the modified example of the second temperature uniform operation may be same as that of the modified example of the first temperature uniform operation.

The third temperature uniform operation may be performed on the basis of the determination result of whether or not an absolute value of the difference between the element temperatures CT2 and CT3 is larger than a third threshold value TH3, as with the modified example of the first temperature uniform operation. The modified example of the third temperature uniform operation is different from the modified example of the first temperature uniform operation which is illustrated in FIG. 18 in that (i) the "switching element S3" in the latter operation is replaced by the "switching element S2" in the former operation, (ii) the "switching element S4" in the latter operation is replaced by the "switching element S3" in the former operation, (iii) the "element temperature CT3" in the latter operation is replaced by the "element temperature CT2" in the former operation and (iv) the "element temperature CT4" in the latter operation is replaced by the "element temperature CT3" in the former operation. Another feature of the modified example of the third temperature uniform operation may be same as that of the modified example of the first temperature uniform operation.

The fourth temperature uniform operation may be performed on the basis of the determination result of whether or not an absolute value of the difference between the element temperatures CT1 and CT4 is larger than a third threshold value TH3, as with the modified example of the first temperature uniform operation. The modified example of the fourth temperature uniform operation is different from the modified example of the first temperature uniform operation which is illustrated in FIG. 18 in that (i) the "switching element S3" in the latter operation is replaced by the "switching element S1" in the former operation and (ii) the "element temperature CT3" in the latter operation is replaced by the "element temperature CT1" in the former operation. Another feature of the modified example of the fourth temperature uniform operation may be same as that of the modified example of the first temperature uniform operation.

(5) Modified Example of Element Temperature

Next, a modified example of the operation for obtaining the element temperatures CT1 to CT4 which is performed by the ECU 40 will be explained. In the above described embodiment, the ECU 40 directly obtains the element temperatures CT1 to CT4 by monitoring the detection result of the temperature sensors TS1 to TS4. However, in the modified example, the ECU 40 may obtain temperature parameters TP1 to TP4 each of which has a predetermined relationship to respective one of the element temperatures CT1 to CT4, in addition to or instead of directly obtaining the element temperatures CT1 to CT4 by monitoring the detection result of the temperature sensors TS1 to TS4. When the ECU 40 obtains the temperature parameters TP1 to TP4, the electrical power converter 33 may not have at least one of the temperature sensors TS1 to TS4.

In the modified example, the ECU 40 may calculate the element temperatures CT1 to CT4 on the basis of the obtained temperature parameters TP1 to TP4, and then may perform the above described first to fourth temperature uniform operations by using the calculated element temperatures CT1 to CT4.

Alternatively, the ECU 40 may perform the above described first to fourth temperature uniform operations by using the obtained temperature parameters TP1 to TP4 as values which are equivalent to the element temperatures CT1 to CT4. In this case, it is preferable that the ECU 40 use, as threshold values which are equivalent to the above described first threshold value TH1 to the above described third threshold value TH3, values which are obtained by performing a predetermined calculation on the above described first threshold value TH1 to the above described third threshold value TH3, wherein the predetermined calculation takes into account a relationship between the temperature parameters TP1 to TP4 and the element temperatures CT1 to CT4.

Alternatively, the ECU 40 may perform the above described first to fourth temperature uniform operations by combining at least one of the element temperatures CT1 to CT4 which are obtained from the temperature sensors TS1 to TS4 and at least one of the temperature parameters TP1 to TP4.

Next, with reference to FIG. 19(a) to FIG. 19(c), three examples of the temperature parameters TP1 to TP4 will be explained. Each of FIG. 19(a) to FIG. 19(c) is a timing chart illustrating one example of the temperature parameters TP1 to TP4. Especially, each of FIG. 19(a) to FIG. 19(c) illustrates the temperature parameters TP3 and TP4 which are used when the electrical power converter 33 operates in the first single operation mode, for the purpose of the simple explanation. However, same is true of the temperature parameters TP1 and TP2.

(5-1) First Example of Temperature Parameter

As illustrated in FIG. 19(a), the temperature parameter TP3 may be a cumulative total value of the loss of the switching element S3. The element temperature CT3 is larger as the cumulative total value of the loss of the switching element S3 is larger. The temperature parameter TP4 may be a cumulative total value of the loss of the switching element S4. The element temperature CT4 is larger as the cumulative total value of the loss of the switching element S4 is larger. The loss of the switching element S3 may be a sum of (i) a switching ON loss (the loss which occurs when the switching state of the switching element S3 is changed from the OFF state to the ON state), (ii) a steady loss (the loss which occurs when the switching element S3 is in the ON state) and (iii) a switching OFF loss (the loss which occurs when the switching state of the switching element S3 is changed from the ON state to the OFF state). Same is true of the loss of the switching element S4.

The ECU 40 may calculates the temperature parameters TP3 and TP4 each of which corresponds to the cumulative total value of the loss by using a map (alternatively, any approximate formula or the like) which represents a relationship between the loss and an operational parameter which is capable of specifying the operational state of the electrical power converter 33. The operational parameter may include at least one of the electrical current I(L1) which flows through the reactor L1, a voltage between the electrical source line PL and the ground line GL, and a frequency of a carrier signal which is used to control the switching states of the switching elements S1 to S4.

Here, the operation which changes the switching pattern on the basis of the first example of the temperature parameters TP3 and TP4 under the situation where the switching state of the switching element S3 is changed while the switching state of the switching element S4 is kept in the ON state (see a time t11) will be explained, as one example. In this case, the loss of the switching element S3 increases more than the loss of the switching element S4 does, because the switching state of the switching element S3 is changed. Namely, the temperature parameter TP3 becomes larger than the threshold value which equivalent to the first threshold value TH1 at an earlier timing than the temperature parameter TP3 does (see a time t12). When the temperature parameter TP3 is larger than the threshold value which equivalent to the first threshold value TH1, the ECU 40 changes the switching pattern. Furthermore, the ECU 40 initializes the temperature parameters TP3 and TP4 in addition to change the switching pattern. After that, same operation will be repeated.

(5-2) Second Example of Temperature Parameter

As illustrated in FIG. 19(b), the temperature parameter TP3 may be the number of the switching of the switching element S3. The element temperature CT3 is larger as the number of the switching of the switching element S3 is larger. The temperature parameter TP4 may be the number of the switching of the switching element S4. The element temperature CT4 is larger as the number of the switching of the switching element S4 is larger.

Here, the operation which changes the switching pattern on the basis of the second example of the temperature parameters TP3 and TP4 under the situation where the switching state of the switching element S3 is changed while the switching state of the switching element S4 is kept in the ON state (see a time t21) will be explained, as one example. In this case, the temperature parameter TP3 gradually increases, because the switching state of the switching element S3 is changed. Then, the temperature parameter TP3 becomes larger than the threshold value which equivalent to the first threshold value TH1 at a time t22. When the temperature parameter TP3 is larger than the threshold value which equivalent to the first threshold value TH1, the ECU 40 changes the switching pattern. Furthermore, the ECU 40 initializes the temperature parameters TP3 and TP4 in addition to change the switching pattern. After that, same operation will be repeated.

(5-3) Third Example of Temperature Parameter

As illustrated in FIG. 19(c), the temperature parameter TP3 may be a length of a period when the switching state of the switching element S4 is kept in the ON state. The number of the switching of the switching element S3 is larger and thus the element temperature CT3 is larger as the length of the period when the switching state of the switching element S4 is kept in the ON state is larger. The temperature parameter TP4 may be a length of a period when the switching state of the switching element S3 is kept in the ON state. The number of the switching of the switching element S4 is larger and thus the element temperature CT4 is larger as the length of the period when the switching state of the switching element S3 is kept in the ON state is larger.

The temperature parameter TPi (i is any integer which is more than 0 and less than 5) which is capable of specifying the element temperature CTi of the switching element Si may be a length of a period when the switching state of the switching element Sj (j is any integer which is more than 0 and less than 5 and which is different from i) which constitutes the upper arm or the lower arm with the switching element Si is kept in the ON state.

For example, when the electrical power converter 33 operates in the first or second single operation mode, the temperature parameter TP1 may be a length of a period when the switching state of the switching element S2 is kept in the ON state. The temperature parameter TP2 may be a length of a period when the switching state of the switching element S1 is kept in the ON state. The temperature parameter TP3 may be a length of a period when the switching state of the switching element S4 is kept in the ON state. The temperature parameter TP4 may be a length of a period when the switching state of the switching element S3 is kept in the ON state.

For example, when the electrical power converter 33 operates in the third or fourth single operation mode, the temperature parameter TP1 may be a length of a period when the switching state of the switching element S4 is kept in the ON state. The temperature parameter TP2 may be a length of a period when the switching state of the switching element S3 is kept in the ON state. The temperature parameter TP3 may be a length of a period when the switching state of the switching element S2 is kept in the ON state. The temperature parameter TP4 may be a length of a period when the switching state of the switching element S1 is kept in the ON state.

Here, the operation which changes the switching pattern on the basis of the third example of the temperature parameters TP3 and TP4 under the situation where the switching state of the switching element S3 is changed while the switching state of the switching element S4 is kept in the ON state (see a time t31) will be explained, as one example. In this case, the temperature parameter TP3 gradually increases, because the switching state of the switching element S4 is kept in the ON state. Then, the temperature parameter TP3 becomes larger than the threshold value which equivalent to the first threshold value TH1 at a time t32. When the temperature parameter TP3 is larger than the threshold value which equivalent to the first threshold value TH1, the ECU 40 changes the switching pattern. Furthermore, the ECU 40 initializes the temperature parameters TP3 and TP4 in addition to change the switching pattern. After that, same operation will be repeated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the scope of the invention. An electrical power converter, which involve such changes, are also intended to be within the technical scope of the present invention.

CROSS-REFERENCE TO RELATED APPLICATIONS

This application is based upon and claims the benefit of priority of the prior Japanese Patent Application No. 2014-104537, file on May 20, 2014, the entire contents of which are incorporated herein by reference. In addition, the entire contents of the above described Patent Literature 1 are incorporated herein by reference.

DESCRIPTION OF REFERENCE CODES 1 vehicle
30 electrical source system
31 first electrical source
32 second electrical source
33 electrical power converter
40 ECU
C smoothing capacitor
L1, L2 reactor
S1, S2, S3, S4 switching element
CT1, CT2, CT3, CT4 element temperature

What is claimed is:

1. An electrical source control apparatus which is configured to control an electrical source system,
the electrical source system comprising:
a first electricity storage apparatus;
a second electricity storage apparatus; and
an electrical power converter having a plurality of switching elements including at least four switching elements which are electrically connected in series, each of the plurality of switching elements being located in both of a first electrical power conversion path and a second electrical power conversion path, the first electrical conversion path passing through the first electricity storage apparatus and being used to perform an electrical power conversion with the first electricity storage apparatus, the second electrical conversion path passing through the second electricity storage apparatus and being used to perform an electrical power conversion with the second electricity storage apparatus,
the electrical source control apparatus comprising a controller,
the controller being programmed to:
select one switching element from at least two switching elements of the plurality of switching elements, the at least two switching elements constituting an upper arm or lower arm that is selected from the plurality of switching elements to perform the electrical power conversion with one of the first and second electricity storage apparatuses in a single operation mode based on a determination to perform the electrical power conversion with a selected one of the first and the second electricity storage apparatuses; and
control the electrical power converter to change a switching state of the selected one switching element while keeping a switching state of another one of the at least two switching elements which is different from the selected one switching element in an ON state to perform the electrical power conversion with the selected one of the first and the second electricity storage apparatus,
the controller being programmed to newly select the one switching element from the at least two switching elements and perform the electrical power conversion with the at least two switching elements such that a difference between temperatures of the at least two switching elements when the switching state of the newly selected one switching element is changed is smaller than the difference between the temperatures of the at least two switching elements when the switching state of the selected one switching element continues to be changed, when it is determined that a temperature of at least one of the at least two switching elements satisfies a predetermined condition.

2. The electrical source control apparatus according to claim 1, wherein
the controller is programmed to newly select the one switching element when the temperature of the selected one switching element is larger than a first threshold value.

3. The electrical source control apparatus according to claim 1, wherein
the controller is programmed to newly select the one switching element when the difference between the temperatures of the at least two switching elements is larger than a second threshold value.

4. The electrical source control apparatus according to claim 1, wherein
when the temperature of a first switching element of the at least two switching element is larger than a first threshold value under the situation where the first switching element is selected as the one switching element, the controller is programmed to newly select, as the one switching element, a second switching element of the at least two switching elements which is different from the first switching element.

5. The electrical source control apparatus according to claim 1, wherein
when the difference between the temperatures of the at least two switching element is larger than a second threshold value under the situation where a first switching element of the at least two switching element is selected as the one switching element, the controller is programmed to newly select, as the one switching element, a second switching element of the at least two switching elements which is different from the first switching element.

6. The electrical source control apparatus according to claim 5, wherein
the controller being programmed to newly select, as the one switching element, the second switching element such that the difference between the temperatures of the at least two switching elements when the switching state of the second switching element is changed is smaller than the difference between the temperatures of the at least two switching elements when the switching state of the first switching element continues to be changed.

7. The electrical source control apparatus according to claim 1, wherein
the controller is further programmed to control the electrical power converter to perform at least one of an input limitation and an output limitation, when the temperature of at least one of the at least two switching elements is larger than a third threshold value, wherein the input limitation limits the electrical power which is inputted to the electrical source system and the output limitation limits the electrical power which is outputted from the electrical source system.

8. The electrical source control apparatus according to claim 1, wherein the controller is further programmed to obtain a temperature characteristic value which directly or indirectly represents the temperatures of the at least two switching elements, the controller is further programmed to newly select the one switching element on the basis of the temperature characteristic value.

9. The electrical source control apparatus according to claim 8, wherein the temperature characteristic value includes at least one of:

an output value of a temperature sensor which detects the temperature of at least one of the at least two switching elements;

a switching loss of at least one of the at least two switching elements;

a number of the switching of the one switching element; and a period during which the another one of the at least two switching elements is kept in the ON state.

\* \* \* \* \*